US010084724B2

(12) United States Patent
Bernat et al.

(10) Patent No.: US 10,084,724 B2
(45) Date of Patent: Sep. 25, 2018

(54) TECHNOLOGIES FOR TRANSACTIONAL SYNCHRONIZATION OF DISTRIBUTED OBJECTS IN A FABRIC ARCHITECTURE

(71) Applicant: Intel Corporation, Santa Clara, CA (US)

(72) Inventors: Francesc Guim Bernat, Barcelona (ES); Kshitij A. Doshi, Tempe, AZ (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 15/260,626

(22) Filed: Sep. 9, 2016

(65) Prior Publication Data

US 2018/0077086 A1 Mar. 15, 2018

(51) Int. Cl.
*H04L 12/933* (2013.01)
*H04L 12/931* (2013.01)
(Continued)

(52) U.S. Cl.
CPC .......... *H04L 49/103* (2013.01); *H04L 49/355* (2013.01); *G06F 3/067* (2013.01); *G06F 12/084* (2013.01); *H04L 29/08135* (2013.01)

(58) Field of Classification Search
CPC ........... H06L 29/0845; H06L 29/05135; H06L 41/5096; H06L 67/00; H06L 67/1097;
(Continued)

(56) References Cited

U.S. PATENT DOCUMENTS 5,423,044 A * 6/1995 Sutton ...................... G06F 9/52
710/200
5,828,876 A * 10/1998 Fish .................. G06F 17/30224
(Continued)

FOREIGN PATENT DOCUMENTS

WO 2015112148 7/2015

OTHER PUBLICATIONS

International search report for PCT application PCT/US2017/046107, dated Nov. 22, 2017 (3 pages).
(Continued)

*Primary Examiner* — Warner Wong
(74) *Attorney, Agent, or Firm* — Barnes & Thornburg LLP

(57) ABSTRACT

Technologies for performing switch-based collective operations in a fabric architecture include a computing node that includes a host fabric interface (HFI) usable to communicate with network computing devices of the fabric architecture. The HFI is configured to associate an object with a transaction identifier generated by the HFI for a corresponding transactional synchronization session managed by the HFI of the computing node. Additionally, the HFI is configured to store received data associated with received write transaction that include the transaction identifier in a local buffer of the HFI. Upon receiving a transactional synchronization session termination request, the HFI is configured to initiate a write of the data stored in the local buffer of the HFI to one of the one or more data storage devices of the computing node. Other embodiments are described herein.

25 Claims, 10 Drawing Sheets

(51) Int. Cl.
  *G06F 3/06* (2006.01)
  *H04L 29/08* (2006.01)
  *G06F 12/084* (2016.01)

(58) Field of Classification Search
  CPC ............... H06F 15/17331; H06F 3/067; H06F 2212/254; H06F 11/0709; H06F 9/5061; H06F 12/084; H06F 12/0842
  See application file for complete search history.

(56) References Cited

U.S. PATENT DOCUMENTS

| | | | |
|---|---|---|---|
| 6,272,291 B2* | 8/2001 | Ohmura | G02B 7/34 396/114 |
| 8,086,579 B1* | 12/2011 | Chandrasekaran | G06F 17/30362 707/689 |
| 8,510,334 B2* | 8/2013 | Chan | G06F 17/30362 707/610 |
| 8,719,829 B2* | 5/2014 | Mukherjee | G06F 9/52 718/1 |
| 2006/0167921 A1* | 7/2006 | Grebus | G06F 11/3006 |
| 2006/0212573 A1* | 9/2006 | Loaiza | G06F 9/526 709/225 |
| 2006/0225077 A1* | 10/2006 | Anderson | G06F 9/526 718/104 |
| 2006/0248127 A1* | 11/2006 | Whitehouse | G06F 9/526 |
| 2009/0198918 A1 | 8/2009 | Arimilli et al. | |
| 2009/0240869 A1 | 9/2009 | O'Krafka et al. | |
| 2011/0137879 A1* | 6/2011 | Dubey | G06F 17/30171 707/704 |
| 2011/0145499 A1* | 6/2011 | Ananthanarayanan | G06F 12/0866 711/118 |
| 2012/0310881 A1* | 12/2012 | Shadmon | G06F 17/30362 707/613 |
| 2015/0120645 A1 | 4/2015 | Varakur | |
| 2015/0269116 A1* | 9/2015 | Raikin | B01D 53/9418 709/212 |
| 2016/0092464 A1 | 3/2016 | Hildebrand et al. | |
| 2017/0132124 A1* | 5/2017 | Gschwind | G06F 12/0215 |

OTHER PUBLICATIONS

Written opinion for PCT application PCT/US2017/046107, dated Nov. 22, 2017 (4 pages).

* cited by examiner

TECHNOLOGIES FOR TRANSACTIONAL SYNCHRONIZATION OF DISTRIBUTED OBJECTS IN A FABRIC ARCHITECTURE

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

To carry out such processor intensive computations, various computing technologies have been implemented to distribute workloads across different network computing devices, such as parallel computing, distributed computing, etc. In support of such distributed workload operations, multiprocessor hardware architecture (e.g., multiple multi-core processors that share memory) has been developed to facilitate multiprocessing (i.e., coordinated, simultaneous processing by more than one processor) across local and remote shared memory systems using various parallel computer memory design architectures, such as non-uniform memory access (NUMA), and other distributed memory architectures. As a result of the distributed computing architectures, information for a given application can be stored across multiple interconnected computing nodes. However, as distributed systems grow in size and scale, read/write access requests to data from local processors and processors of remote network computing devices can lead to potential memory access conflicts.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
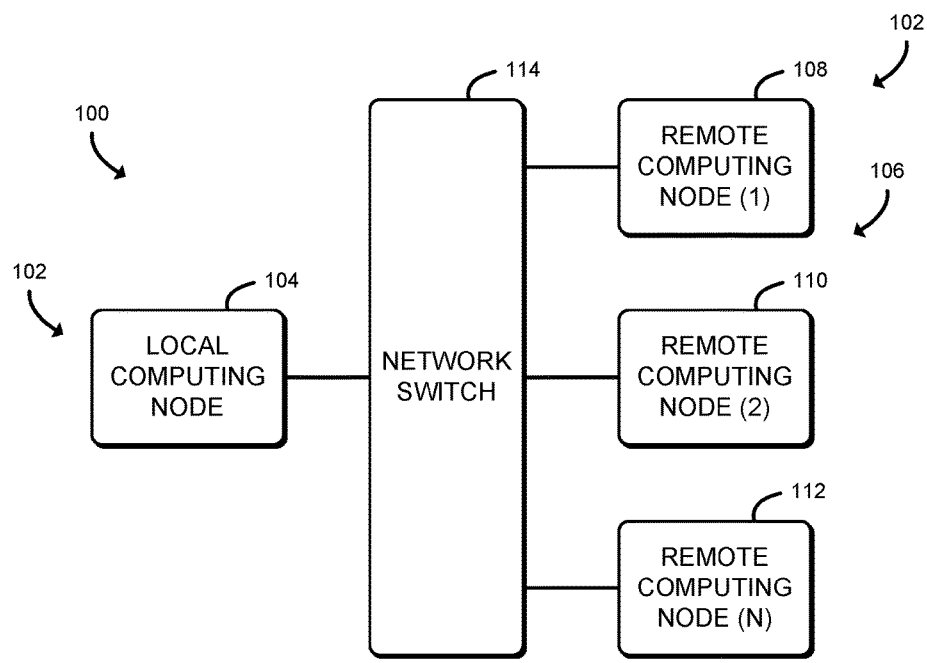
FIG. 1 is a simplified block diagram of at least one embodiment of a system for transactional synchronization of distributed objects in a fabric architecture that includes multiple computing nodes communicatively coupled via a network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for transactional synchronization of distributed objects in a fabric architecture includes multiple computing nodes 102 of the fabric architecture communicatively coupled via a series of fabric interconnects to a network switch 114. The illustrative computing nodes 102 includes a local computing node 104 and multiple remote computing nodes 106 communicatively coupled to a network switch 114. It should be appreciated that the network switch 114 as referred to herein is capable of transmitting and receiving network traffic (e.g., network packets, messages, datagrams, etc.) between the computing nodes 102.

The illustrative remote computing nodes 106 include a first remote computing node, which is designated as remote computing node (1) 108, a second remote computing node, which is designated as remote computing node (2) 110, and a third remote computing node, which is designated as remote computing node (N) 112 (i.e., the "Nth" remote computing node of the remote computing nodes 106, wherein "N" is a positive integer and designates one or more additional remote computing nodes 106). It should be appreciated that, in other embodiments, there may be any number of computing nodes 102 (e.g., other local computing nodes 104, other remote computing nodes 106, etc.) coupled to the illustrative network switch 114 or another network switch 114 in the system 100. Accordingly, there may be multiple network switches 114 in other embodiments. As such, it should be further appreciated that, in such embodiments, multiple network switches 114 may be connected, or daisy chained, to each other.

In use, one or more of the computing nodes 102 performs a transactional execution (e.g., a hardware transactional execution) using transactional synchronization at an object granularity of objects that are distributed across different address spaces. It should be appreciated that such different address spaces may be distributed across one of the computing nodes 102 (e.g., in different processes on the same computing node 102) or across more than one of the computing nodes 102. To perform transactional executions using transactional synchronization, the computing nodes 102 may extend present transactional memory technologies, such as Intel's transactional synchronization extensions (TSX) in which the mapping of memory address spaces can be extended to objects.

For example, an application (e.g., being run on a software stack) that is executing on a processor core (see, e.g., the processor cores 204, 210 of FIG. 2) of one of the computing nodes 102 executes an instruction (e.g., via the software stack) to initiate an object association, or a transactional synchronization session. A receiving host fabric interface (HFI) (see, e.g., the HFI 222 of FIG. 2) then allocates an identifier (i.e., a transaction ID) to be associated with the transaction synchronization session. It should be appreciated that the HFI is configured to first determine whether the object is homed local or remote to the HFI. If the object is remotely homed (e.g., homed local to a remote computing node 106 relative to the local computing node 104), such association and subsequent transaction requests may be forwarded by the HFI (e.g., of the local computing node 104) to a remotely located HFI (e.g., of the remote computing node 106).

Upon the processor core having received an indication from the HFI (e.g., receiving the transaction ID via the software stack), the application (e.g., thread, process, etc.) may then register an object to be associated with the transaction ID with the HFI. It should be appreciated that the term "object" or "objects" as used herein may refer to any type of structure which may contain data (e.g., attributes in fields), code (e.g., methods, procedures, etc.), etc. Upon receiving the association registration request for a locally homed object, the HFI stores the association between the object and the transaction ID locally to the HFI; otherwise, if the received association registration request is for a remotely homed object, the HFI forwards the request to a corresponding remote computing node 106 to which the object is locally homed. It should be appreciated that, in some embodiments, the association may be stored in the initiating processor core. It should be further appreciated that all the address spaces corresponding to objects are mapped to the HFI. To do so, in some embodiments, logic of the processor core (e.g., caching agent logic, homed agent logic, etc.) may be re-used by the HFI.

Subsequent to having registered the object association and having received an acknowledgment thereof, the application may then proceed to perform read and/or write transactions associated with the object for which the transactional synchronization session corresponds. The read operations proceed as normal, while the data associated with the write operations are captured and written to a temporary buffer (e.g., the buffer storage 224) of the HFI until an instruction is received by the HFI indicating to end the transactional synchronization (i.e., a transactional synchronization session exit request) via the software stack. Upon receiving the transactional synchronization session exit request instruction, the HFI commits the data of the write operations stored at the temporary buffer of the HFI to main memory.

The computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. As described previously, the illustrative computing nodes 102 include the local computing node 104 and the remote computing nodes 106; however, it should be appreciated that the computing nodes 102 may include additional and/or alternative computing nodes, such as controller nodes, network nodes, utility nodes, etc., which are not shown to preserve clarity of the description.

Figure 2:
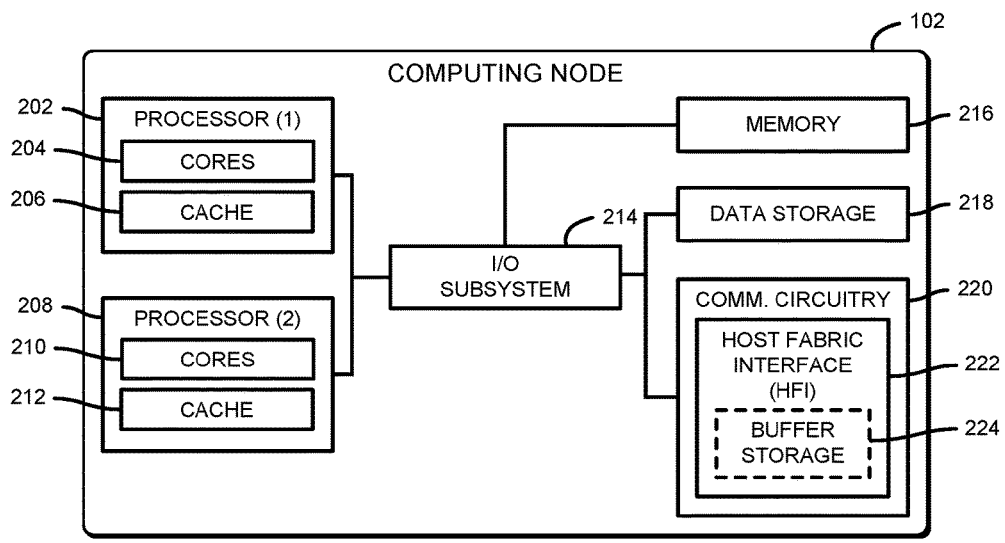
FIG. 2 is a simplified block diagram of at least one embodiment of one of the computing nodes of the system of FIG. 1.

As shown in FIG. 2, an illustrative computing node 102 includes a first processor, designated as processor (1) 202, a second processor, designated as processor (2) 208, an input/output (I/O) subsystem 214, a main memory 216, a data storage device 218, and communication circuitry 220. Of course, it should be appreciated that one or more of the computing nodes 102 may include other or additional components, such as those commonly found in a computing device (e.g., peripheral devices, other processing/storage hardware, etc.), in other embodiments. Additionally, in some embodiments, one or more of the illustrative components may be incorporated in, or otherwise form a portion of, another component. For example, cache memory of the computing node 102 (e.g., cache memory 206, 212), or portions thereof, may be incorporated in one or both of the processors 202, 208 in some embodiments. Further, in some embodiments, one or more of the illustrative components may be omitted from the computing node 102. For example, although the illustrative computing node 102 includes two processors 202, 208, the computing node 102 may include a greater number of processors in other embodiments.

Each of the processors 202, 208 (i.e., physical processor packages) may be embodied as any type of multi-core processor capable of performing the functions described herein, such as, but not limited to, a single physical multi-processor core chip, or package. The illustrative processor (1) 202 includes one or more processor cores 204, while the illustrative processor (2) 208 similarly includes one or more processor cores 210. As described previously, each of the processors 202, 208 includes more than one processor core (e.g., 2 processors cores, 4 processors cores, 8 processors cores, 16 processors cores, etc.).

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that, in some embodiments of the computing node 102 (e.g., supercomputers), the computing node 102 may include thousands of processor cores. Each of the processors 202, 208 may be connected to a physical connector, or socket, on a motherboard (not shown) of the computing node 102 that is configured to accept a single physical processor package (i.e., a multi-core physical integrated circuit).

The illustrative processor (1) 202 additionally includes a cache memory 206 and the illustrative processor (2) 208 includes a cache memory 212. Each cache memory 206, 212 may be embodied as any type of cache that the respective processor 202, 208 can access more quickly than the main memory 216, such as an on-die or on-processor cache. In such embodiments, an on-die interconnect interface of the computing node 102 may be configured to generate requests to an agent entity, such as a homed agent or a caching agent configured to initiate transactions into coherent memory. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as one or more of an L1, L2, or L3 cache, for example.

The main memory 216 may be embodied as any type of volatile or non-volatile memory or data storage device capable of performing the functions described herein. In operation, the main memory 216 may store various data and software used during operation of the computing node 102, such as operating systems, applications, programs, libraries, and drivers. The main memory 216 is communicatively coupled to the processors 202, 208 via the I/O subsystem 214, which may be embodied as circuitry and/or components to facilitate input/output operations with the processors 202, 208, the main memory 216, and other components of the computing node 102.

For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the main memory 216, and/or other components of the computing node 102, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the main memory 216 (e.g., the computer-readable storage media) may store various data as described herein, including operating systems, applications, programs, libraries, drivers, instructions, etc., capable of being executed by a processor (e.g., the processor 202, the processor 208, etc.) of the computing node 102.

The communication circuitry 220 may be embodied as any communication circuit, device, or collection thereof, capable of enabling wireless and/or wired communications between the computing node 102 and other computing devices (e.g., another computing node 102, the network switch 114, etc.). The communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

The illustrative communication circuitry 220 includes a host fabric interface (HFI) 222. The HFI 222 may be embodied as one or more add-in-boards, daughtercards, network interface cards, controller chips, chipsets, or other devices that may be used by the computing node 102. For example, in some embodiments, the HFI 222 may be integrated with one or both of the processors 202, 208 (e.g., on a coherent fabric within one or both of the processors 202, 208), embodied as an expansion card coupled to the I/O subsystem 214 over an expansion bus (e.g., PCI Express (PCIe)), part of a SoC that includes one or more processors, or included on a multichip package that also contains one or more processors.

Additionally or alternatively, in some embodiments, functionality of the HFI 222 may be integrated into one or more components of the computing node 102 at the board level, socket level, chip level, and/or other levels. The HFI 222 is configured to facilitate the transfer of data/messages to enable tasks executing on the processors 202, 208 to access shared structures (e.g., shared physical memory) of the other computing nodes 102, such as may be necessary during parallel or distributed computing operations as described herein. In some embodiments, the HFI 222 may include a buffer storage 224 that is usable to temporarily store data local to the HFI 222.

As described previously, the computing nodes 102 may be embodied as compute nodes and/or storage nodes. Accordingly, it should be appreciated that those computing nodes 102 implemented as storage nodes may generally include more data storage capacity than those computing nodes 102 that are embodied as compute nodes. Similarly, it should also be appreciated that those computing nodes 102 implemented as compute nodes may generally include more processor capability that those computing nodes 102 implemented as storage nodes. In other words, the storage nodes may be embodied as physical servers including numerous hard-disk drives (HDDs) or solid-state drives (SDDs) relative to the number of storage devices of the compute nodes, whereas the compute nodes may be embodied as physical servers including numerous processors having multiple cores relative to the number of processors of the storage nodes. However, it should be further appreciated that any of the computing nodes 102 may be implemented as a compute node and/or a storage node, regardless of the component configuration relative to the other computing nodes 102.

Referring again to FIG. 1, the network switch 114 may be embodied as any type of switching device (e.g., a crossbar switch) capable of forwarding network traffic through the fabric (e.g., via fabric interconnects) in a switched, or switching, fabric architecture, such as a switch (e.g., rack-mounted, standalone, fully managed, partially managed, full-duplex, and/or half-duplex communication mode enabled, etc.), a router, etc. As described previously, the network switch 114 relies on fabric interconnects to communicatively couple the network switch 114 to a number of respective computing nodes 102. The fabric interconnects may be embodied as one or more buses, switches, and/or networks configured to support transmission of network traffic as a function of various interconnect protocols and/or network protocols. In use, the fabric interconnects are utilized by the computing nodes 102 (e.g., via respective HFIs 222) to communicate with the network switch 114 and the other computing nodes 102 (i.e., across the interconnect fabric).

Figure 3:
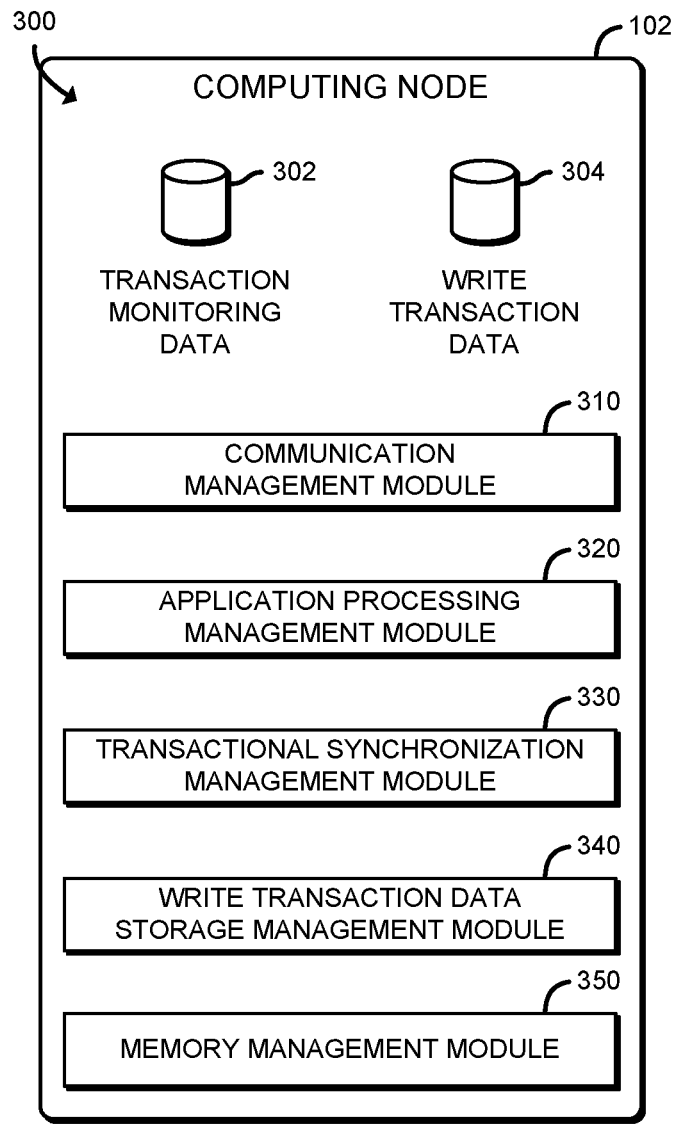
FIG. 3 is a simplified block diagram of at least one embodiment of an environment that may be established by the computing node of FIG. 2.

Referring now to FIG. 3, in an illustrative embodiment, the computing node 102 establishes an environment 300 during operation. The illustrative environment 300 includes a communication management module 310, an application processing management module 320, a transactional synchronization management module 330, a write transaction data storage management module 340, and a memory access management module 350. The various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, an application processing management circuit 320, a transactional synchronization management circuit 330, a write transaction data storage management circuit 340, a memory access management circuit 350, etc.).

It should be appreciated that, in such embodiments, one or more of the communication management circuit 310, the application processing management circuit 320, the transactional synchronization management circuit 330, the write transaction data storage management circuit 340, the memory access management circuit 350 may form a portion of one or more of the processors 202, 208, the I/O subsystem 214, the communication circuitry 220, the HFI 222 of the communication circuitry 220, and/or other components of the computing node 102. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the one or more processors and/or other components of the computing node 102.

In the illustrative environment 300, the computing node 102 further includes transaction monitoring data 302 and write transaction data 304, at least a portion of each of which may be stored in one or more of the caches 206, 212, the main memory 216, the data storage device 218, and/or other memory of the computing node 102, such as the buffer storage 224 of the HFI 222. Further, each of the transaction monitoring data 302 and the write transaction data 304 may be accessed by the various modules and/or sub-modules of the computing node 102. Additionally, it should be appreciated that in some embodiments the data stored in, or otherwise represented by, each of the transaction monitoring data 302 and the write transaction data 304 may not be mutually exclusive relative to each other.

For example, in some implementations, data stored in the transaction monitoring data 302 may also be stored as a portion of the write transaction data 304, and/or vice versa. As such, although the various data utilized by the computing node 102 is described herein as particular discrete data, such data may be combined, aggregated, and/or otherwise form portions of a single or multiple data sets, including duplicative copies, in other embodiments. It should be further appreciated that the computing node 102 may include additional and/or alternative components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the computing node 102. To do so, the communication management module 310 is configured to receive and process network packets from network computing devices (e.g., other computing nodes 102, the network switch 114, etc.) communicatively coupled to the computing node 102 (e.g., via fabric interconnects). Additionally, the communication management module 310 is configured to prepare and transmit network packets to network computing devices (e.g., other computing nodes 102, the network switch 114, etc.) communicatively coupled to the computing node 102 (e.g., via fabric interconnects).

The application processing management module 320, which may be embodied as hardware, firmware, software, virtualized hardware, emulated architecture, and/or a combination thereof as discussed above, is configured to manage the processing of application instructions. To do so, the application processing management module 320 is configured to perform the resource allocation and process scheduling for each of the processor cores 204, 210 of each of the processors 202, 208. In some embodiments, for example, the application processing management module 320 may include or otherwise be configured as a software stack (e.g., an embedded software stack). In such embodiments, the software stack may include one or more applications, middleware, and/or the operating system of the computing node 102.

The transactional synchronization management module 330, which may be embodied as hardware, firmware, software, virtualized hardware, emulated architecture, and/or a combination thereof as discussed above, is configured to perform the transactional synchronization logic. In other words, the transactional synchronization management module 330 is configured to manage the transactional synchronization transactions, such as may be generated from the application processing management module 320, which are homed local to the computing node 102. The transactional synchronization management module 330 is further configured to forward requests (e.g., from applications presently executing on the computing node 102) associated with remotely homed objects.

Additionally, the transactional synchronization management module 330 is configured to register local objects being monitored and associated with each transaction during a transactional synchronization session. For example, in some embodiments, the transactional synchronization management module 330 may be configured to store object information related to an object in a corresponding entry of a monitoring table. In some embodiments, the object information stored in an entry of the monitoring table may include a memory address of the object, an access mode (e.g., read, write, etc.) associated with the object, a transaction ID associated with the transactional synchronization session, an identifier of the computing node 102 to which the object is locally homed, and/or any other information related to the object associated with the transaction. In some embodiments, the object information may be stored in the transaction monitoring data 302.

The write transaction data storage management module 340, which may be embodied as hardware, firmware, software, virtualized hardware, emulated architecture, and/or a combination thereof as discussed above, is configured to manage the temporary storage of write data associated with write transactions during a transactional synchronization session. In some embodiments, the HFI 222 stores the storage location (e.g., a physical or virtual address) of the data to an entry of a table (e.g., a transaction storage table), such that the data can be associated with the object and retrieved at a later point in time. Accordingly, the write transaction data storage management module 340 is configured to interface (e.g., read/write) with and manage (e.g., add, delete, update, etc.) a table capable of storing such information associated with write transactions in progress (i.e., the transaction storage table). In some embodiments, the temporarily stored data may be stored in the write transaction data 304.

The memory access management module 350, which may be embodied as hardware, firmware, software, virtualized hardware, emulated architecture, and/or a combination thereof as discussed above, is configured to manage memory read/write accesses to data storage devices of the computing node 102. In other words, the memory access management module 350 is configured to manage access to the caches 206, 212, the main memory 216, the data storage device 218, and/or other memory of the computing node 102 (e.g., a memory local to the HFI 222). Accordingly, the memory access management module 350 may be configured to reside in or otherwise interface with hardware, the operating system, and/or programs/applications of the computing node 102.

Figure 4A:
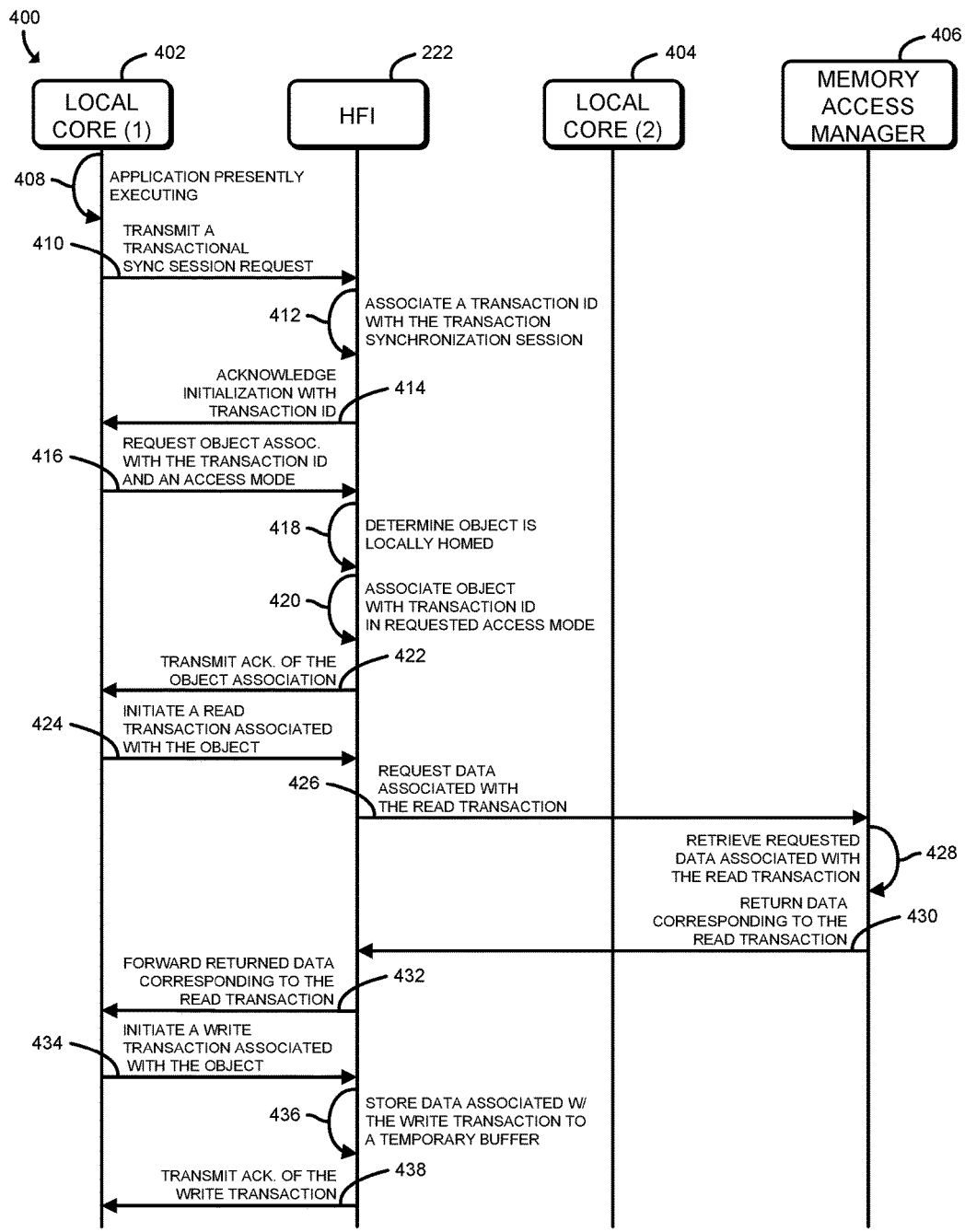
FIGS. 4A-4B is a simplified communication flow diagram of at least one embodiment of an illustrative transactional synchronization session constrained local to one of the computing nodes of the system of FIG. 1.
Figure 4B:
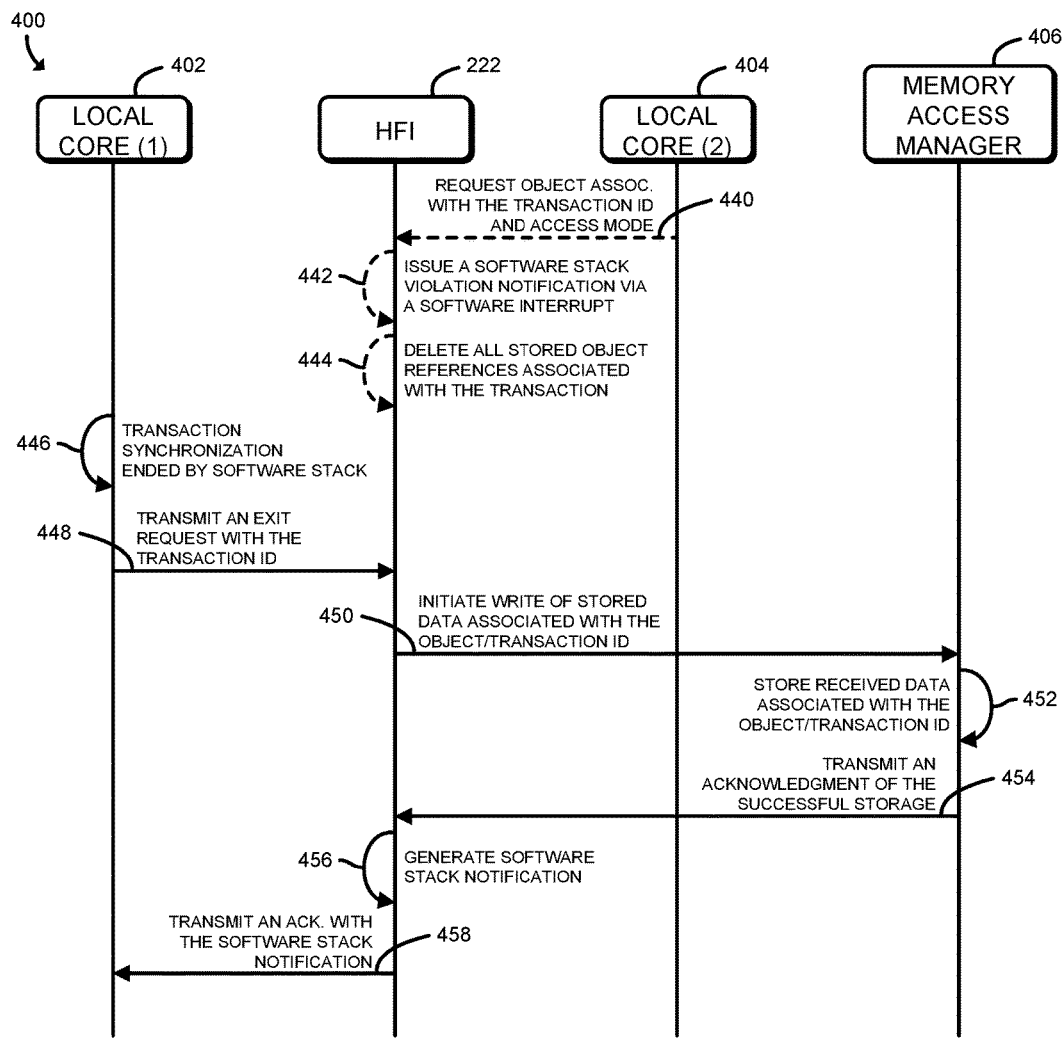

Referring now to FIGS. 4A and 4B, an embodiment of a communication flow 400 of an illustrative transactional synchronization session includes a local processing core designated as local core (1) 402 (e.g., one of the processing cores 204 of the processor (1) 202, one of the processing cores 210 of the processor (2) 208, etc.), the HFI 222, another local processing core designated as local core (2) 404 (e.g., another one of the processing cores 204 of the processor (1) 202, another one of the processing cores 210 of the processor (2) 208, etc.), and a memory access manager 406 (e.g., a memory coherency manager, a homed agent, etc.). The illustrative communication flow 400 includes a number of data flows, some of which may be executed separately or together, depending on the embodiment.

The communication flow 400 begins with data flow 408, in which an application is presently executing on the local core (1) 402 of the computing node 102. Data flows 410 to 414 describe an illustrative initialization of a transactional synchronization session. In data flow 410, the application executing on the local core (1) 402 initiates (e.g., via instruction(s) from the software stack) a transactional synchronization session with the HFI 222. To do so, the application transmits a transactional synchronization session request to the HFI 222, such as by executing an instruction that indicates a transactional synchronization session is to be initialized by the HFI 222. In some embodiments, the instruction may include a pointer to a location in memory at which one or more parameters of the transactional synchronization session may be stored. In data flow 412, the HFI 222 initializes a transactional synchronization session by generating a transaction ID and associating the transaction ID with the transactional synchronization session. To do so, the HFI 222 may allocate an entry in a transactional synchronization session table (e.g., a monitoring table) that is usable to manage subsequent read/write transactions associated with the transaction ID. In data flow 414, the HFI 222 transmits an acknowledgement that includes the generated transaction ID to the local core (1) 402.

Data flows 416 to 422 describe an illustrative object association with a previously initialized transactional synchronization session. In data flow 416, the application executing on the local core (1) 402 transmits (e.g., via instruction(s) from the software stack) a request to the HFI 222 requesting that an object be associated with the transaction ID received from the HFI 222 in the acknowledgment that the transactional synchronization session was initialized. The request additionally includes an access mode that associates the transactional synchronization session as either a read or write enabled transaction for the application requesting access.

In some embodiments, the access mode may be one of a read mode, a write mode, or a promote mode (e.g., a read mode that allows access mode promotion from read mode to write mode). In an illustrative embodiment of a TSX embodiment extension, the access mode operations may be one of: (i) a read access mode (e.g., HFI_TSX_READ @Object), which allows associating a TSX transaction for the object in read mode; (ii) a write access mode (e.g., HFI_TSX_WRITE @Object), which allows associating a TSX transaction for the object in write mode; or (iii) a promote access mode (e.g., HFI_TSX_PROMOTE @Object), which allows associating a TSX transaction for the object and read access mode and promoting the TSX transaction for the object from read access mode to write access mode. It should be appreciated that the HFI 222 may refuse a promotion of the TSX transaction for the object from read access mode to write access mode. Under such conditions, the associated TSX transaction may be aborted.

In data flow 418, the HFI 222 determines whether the object is locally homed. It should be appreciated that the object is determined to be locally homed for the purposes of the communication flow 400 and remotely homed from the purposes of communication flow 500 described below. In data flow 420, the HFI 222 associates an object with the transactional synchronization session (e.g., via the transaction ID) in the requested access mode. To do so, in some embodiments, the HFI 222 may be configured to register object information of the local object associated with the transactional synchronization session in an entry of a monitoring table. As described previously, the object information stored in an entry of the monitoring table may include a memory address of the object, an access mode (e.g., read, write, etc.) associated with the object, a transaction ID associated with the transactional synchronization session, an identifier of the computing node 102 to which the object is locally homed, and/or any other information related to the object associated with the transaction.

It should be appreciated that the object association attempt may result in a violation, such as when the requested access mode is requesting write access to an object to which another transactional synchronization session in write mode is presently active. Under such conditions, a violation may occur and the association may be denied. In data flow 422, the HFI 222 transmits an acknowledgment of the successful object association to the local core (1) 402. Data flows 424 to 438 describe illustrative read/write transactions on objects that may be performed subsequent to the successful object association. It should be appreciated that one or more read and/or write transactions may be performed during the transactional synchronization session.

Data flows 424 to 432 describe an illustrative read transaction on an object previously associated with a transactional synchronization session. In data flow 424, the application executing on the local core (1) 402 initiates a read transaction associated with the object, such as by transmitting instructions from the local core (1) 402 to the HFI 222 via the software stack. In data flow 426, the HFI 222 transmits a request to the memory access manager 406 to retrieve data associated with the read transaction. In data flow 428, the memory access manager 406 retrieves data associated with the request. It should be appreciated that the memory access manager 406 is configured to manage access to one or more of the caches 206, 212, the main memory 216, the data storage device 218, and other memory (e.g., a memory local to the HFI 222) of the computing node 102. As such, the memory access manager 406 may be configured to reside in or otherwise interface with hardware, the operating system, and/or programs/applications of the computing node 102. In data flow 430, the memory access manager 406 returns the retrieved data to the HFI 222. In data flow 432, the HFI 222 forwards the data returned by the memory access manager 406 to the local core (1) 402 (e.g., to be used in a present processing task, propagation by the software stack to the requesting application, etc.).

Data flows 434 to 438 describe an illustrative write transaction on an object previously associated with a transactional synchronization session. It should be appreciated that the transactional synchronization session should presently be in write mode to perform the write transaction on the object bound to the write transaction. In data flow 434, the application executing on the local core (1) 402 initiates a write transaction associated with the object, such as by transmitting instructions from the local core (1) 402 to the HFI 222 via the software stack. In data flow 436, the HFI 222 stores the data (e.g., a payload) associated with the write transaction to a temporary buffer (e.g., the buffer storage 224 of FIG. 2). In some embodiments, the HFI 222 additionally stores the storage location (e.g., a physical or virtual address) of the data to an entry of a table (e.g., the transaction storage table), such that the data can be associated with the object and retrieved at a later point in time. In data flow 438, the HFI 222 returns an acknowledgment of a successful write transaction to the local core (1) 402.

Data flows 440 to 444, shown in FIG. 4B, describe an illustrative violation during a transactional synchronization session. For example, in data flow 440, the local core (2) 404 may initiate (e.g., via instruction(s) from the software stack) an object association request with the HFI 222 that includes the transactional ID and an access mode that conflicts with the present access mode of a presently in-session transactional synchronization session for a particular object. In an illustrative example, the object association request received by the HFI 222 from the local core (2) 404 may include a write mode access request for an object presently associated with a write mode enabled transaction of the local core (1) 402.

Accordingly, in furtherance of the illustrative example, in data flow 442, the HFI 222 may issue a software stack violation notification via a software interrupt that indicates the violation has occurred for a particular object. Further, in data flow 444, the HFI 222 may delete all temporarily stored data associated with the presently in-session write transaction. It should be appreciated that other transactions received from the local core (2) 404 for an object presently associated with a write mode enabled transaction of the local core (1) 402 may not cause a violation, such as a read transaction. Further, it should be appreciated that if the object presently associated with the transactional synchronization session initiated by the local core (1) 402 is presently in read mode, or in promote mode and not yet promoted to write mode, a read or write transaction from another processor core may not result in a violation.

Data flows 446 to 458 describe an illustrative transactional synchronization session termination. In data flow 446, an event occurs at the local core (1) 402 (e.g., a task ends, a process exits, etc.) in which the transactional synchronization session is no longer needed. As such, in data flow 448, the local core (1) 402 transmits, to the HFI 222, a request to exit the transactional synchronization session (i.e., a transactional synchronization session exit request) via an instruction from the software stack that includes the corresponding transaction ID. In data flow 450, the HFI 222 initiates a write of data temporarily stored by the HFI 222 during previous write transactions associated with the object and transaction ID, which were stored in a temporary buffer of the HFI 222 (e.g., the buffer storage 224 of FIG. 2).

In data flow 452, the memory access manager 406 writes the data associated with the object and transaction ID received from the HFI 222 to memory of the computing device 102 (e.g., the main memory 216). In data flow 454, the memory access manager 406 transmits, to the HFI 222, an acknowledgment of the successful write of the associated data to the memory. Upon receipt of the acknowledgment of the successful write, in data flow 456, the HFI 222 generates a software stack notification. In data flow 458, the HFI transmits an acknowledgment that includes the software stack notification to the local core (1) 402.

Figure 5A:
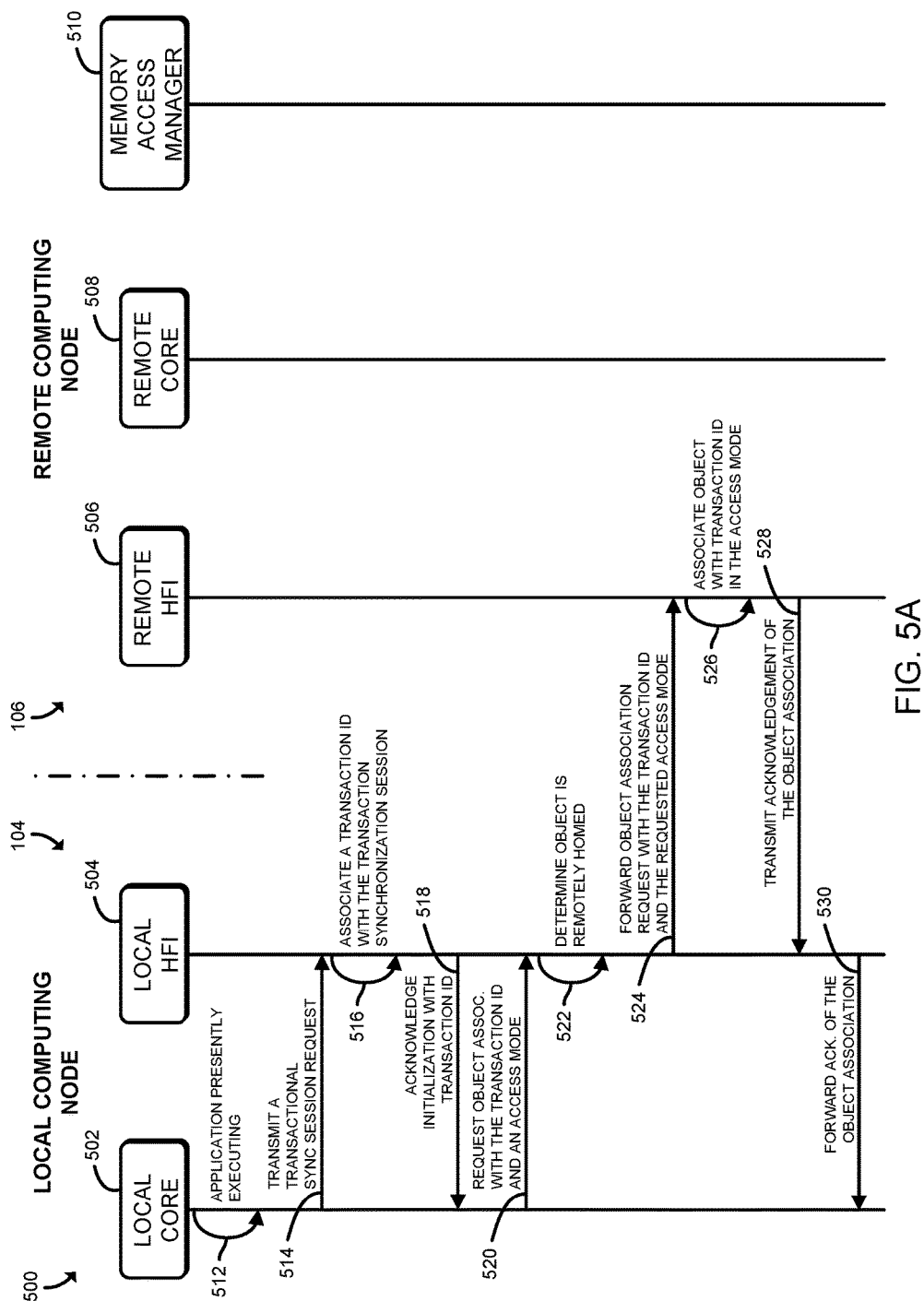
FIGS. 5A-5C is a simplified communication flow diagram of at least one embodiment of an illustrative transactional synchronization session between two communicatively coupled computing nodes of the system of FIG. 1.
Figure 5B:
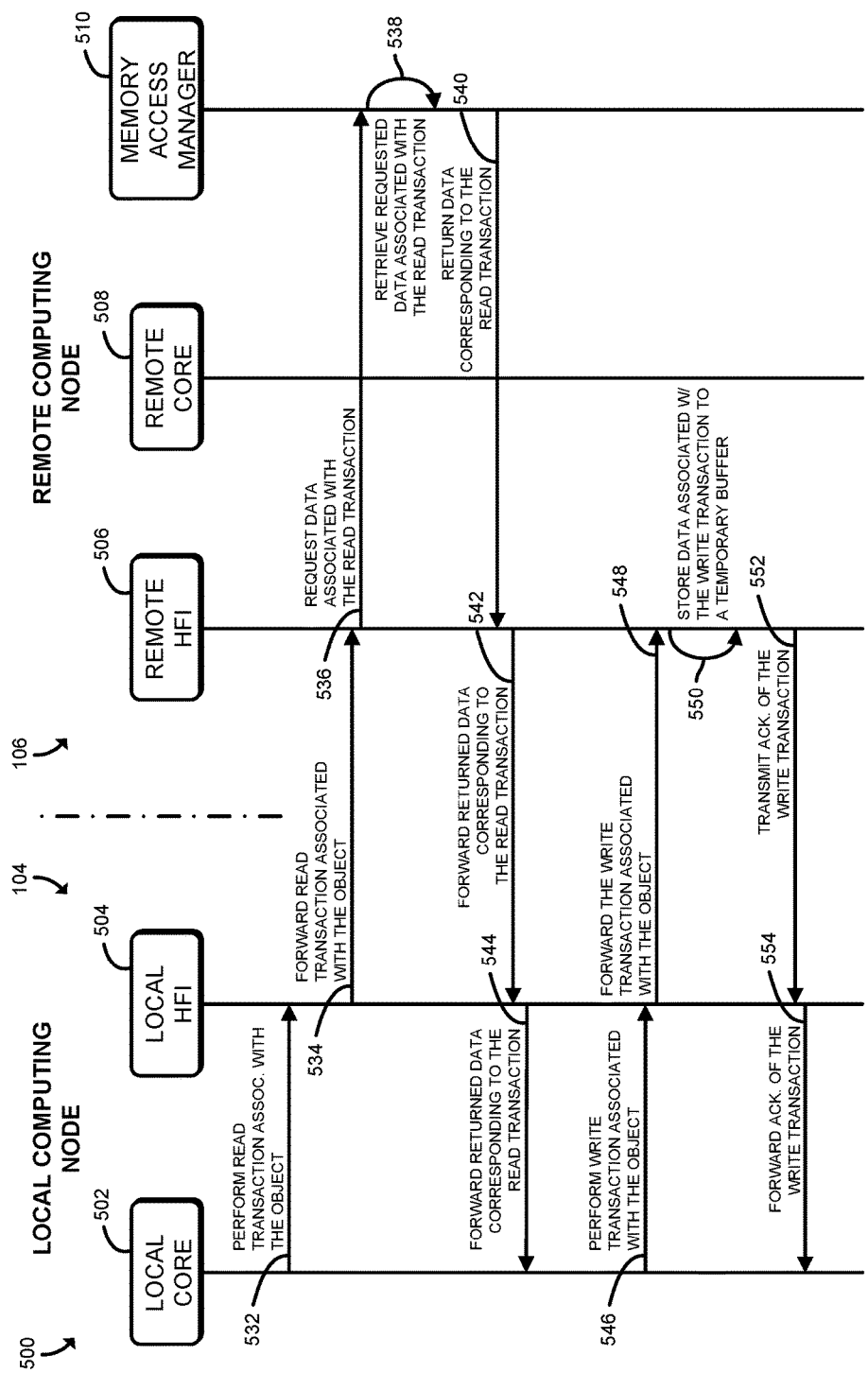
Figure 5C:
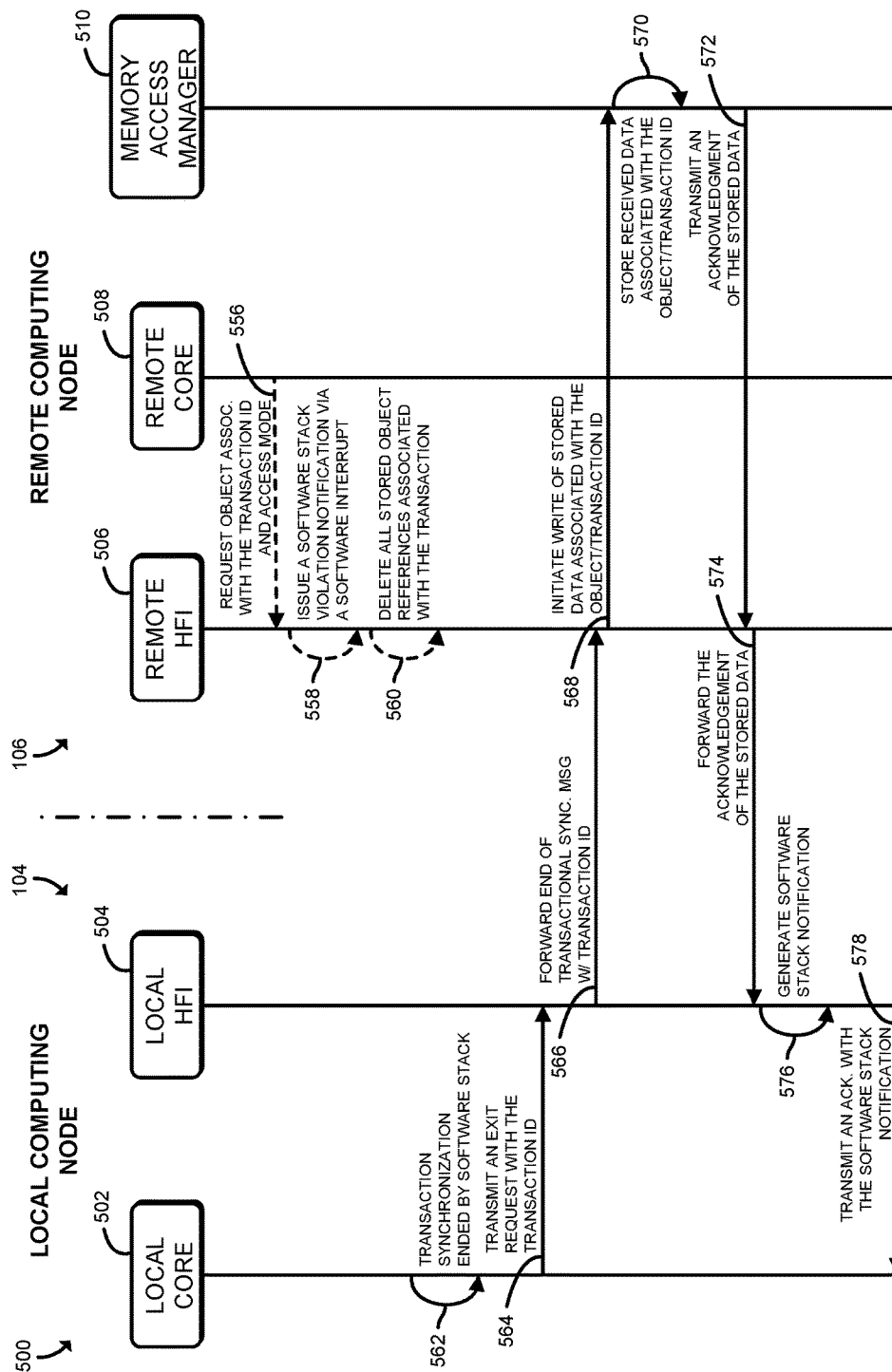

Referring now to FIGS. 5A to 5c, an embodiment of a communication flow 500 of an illustrative transactional synchronization session between two communicatively coupled computing nodes 102 includes a local computing node (e.g., the local computing node 104 of FIG. 1) and a remote computing node (e.g., one of the remote computing nodes 106 of FIG. 1). The local computing node 104 includes a local processing core designated as local core 502 and a local HFI 504. The remote computing node 106 includes a remote HFI 506, a remote core 508, and a memory access manager 510 (e.g., a memory coherency manager, a homed agent, etc.).

It should be appreciated that the local core 502 and the local HFI 504 are local relative to the local computing node 104 and remote relative to the remote computing node 106; whereas the remote HFI 506, the remote core 508, and memory access manager 510 are local relative to the remote computing node 106 and remote relative to the local computing node 104. It should be further appreciated, as shown in FIG. 1 and described above, that the local computing node 104 and the remote computing node 106 may be communicatively coupled via a network switch (e.g., the network switch 114 of FIG. 1) for facilitating the transmission of network traffic therebetween by way of respective fabric interconnects. The illustrative communication flow 400 includes a number of data flows, some of which may be executed separately or together, depending on the embodiment.

The communication flow 500 begins with data flow 512, in which an application is presently executing on the local core 502 of the local computing node 104. Data flows 514 to 518 describe an illustrative initialization of a transactional synchronization session at the local computing node 104. In data flow 514, the application executing on the local core 502 initiates (e.g., via instruction(s) from the software stack of the local computing node 104) a transactional synchronization session with the local HFI 504. To do so, the application transmits a transactional synchronization session request to the HFI 222, such as by executing an instruction that indicates a transactional synchronization session is to be initialized by the local HFI 504. As described previously, in some embodiments, the instruction may include a pointer to a location in memory at which one or more parameters of the transactional synchronization session may be stored.

In data flow 516, the local HFI 504 initializes a transactional synchronization session by generating a transaction ID and associating the transaction ID with the transactional synchronization session. To do so, the local HFI 504 may allocate an entry in a transactional synchronization session table (e.g., a monitoring table) that is usable to manage subsequent read/write transactions associated with the transaction ID. In data flow 515, the HFI 222 transmits an acknowledgement that includes the generated transaction ID to the local core 502.

Data flows 520 to 530 describe an illustrative remotely homed (i.e., relative to the local computing node 102) object association with a previously initialized transactional synchronization session. In data flow 520, the application executing on the local core 502 transmits (e.g., via instruction(s) from the software stack of the local computing node 104) a request to the local HFI 504 requesting that an object be associated with the transaction ID received from the local HFI 504 in the acknowledgment that the transactional synchronization session was initialized. The request additionally includes an access mode that associates the transactional synchronization session as either a read or write enabled transaction for the application requesting access.

As described above, in some embodiments, the access mode may be one of a read mode, a write mode, or a promote mode (e.g., a read mode that allows access mode promotion from read mode to write mode). In an illustrative embodiment of a TSX embodiment extension, as also described above, the access mode operations may be one of: (i) a read access mode (e.g., HFI_TSX_READ @Object), which allows associating a TSX transaction for the object in read mode; (ii) a write access mode (e.g., HFI_TSX_WRITE @Object), which allows associating a TSX transaction for the object in write mode; or (iii) a promote access mode (e.g., HFI_TSX_PROMOTE @Object), which allows associating a TSX transaction for the object and read access mode and promoting the TSX transaction for the object from read access mode to write access mode.

In data flow 522, the local HFI 504 determines whether the object is locally or remotely homed. It should be appreciated that the object is determined to be remotely homed (i.e., remotely homed relative to the local computing node 102) for the purposes of the communication flow 500, as opposed to being locally homed from the purposes of communication flow 400 described above. In data flow 524, the local HFI 504 forwards the request, including the transaction ID and the access mode, to the remote HFI 506 of the remote computing node 106. In data flow 526, the HFI remote 506 associates an object with the transactional synchronization session (e.g., via the transaction ID) in the requested access mode.

It should be appreciated that the association attempt may result in a violation, such as when the requested access mode is requesting write access to an object to which another transactional synchronization session in write mode is presently active. Under such conditions, a violation may occur and the association attempt may fail. In data flow 528, the remote HFI 506 transmits an acknowledgment of the successful object association to the local HFI 504. In data flow 530, the local HFI 504 forwards the acknowledgment of the successful object association to the local core 502.

Data flows 532 to 554, shown in FIG. 5B, describe illustrative read/write transactions on objects that may be performed subsequent to the successful object association. It should be appreciated that one or more read and/or write transactions may be performed during the transactional synchronization session. It should be further appreciated that the local HFI 504 may be configured to track each of the read/write transactions (e.g., in a corresponding entry of a monitoring table) and the remote computing nodes 106 for which the object is remotely homed.

Data flows 532 to 544 describe an illustrative read transaction on a remotely homed (i.e., relative to the local computing node 104) object that is presently associated with a transactional synchronization session. In data flow 532, the application executing on the local core 502 initiates a read transaction associated with the object, such as by transmitting instructions from the local core 502 (e.g., via the software stack of the local computing node 104) to the local HFI 504. In data flow 534, due to the object being remotely homed relative to the local computing node 104 and locally homed relative to the remote computing node 106, the local HFI 504 forwards the read transaction to the remote HFI 506. In data flow 536, the remote HFI 506 transmits a request to the memory access manager 510 to retrieve data associated with the read transaction.

In data flow 538, the memory access manager 510 retrieves data associated with the request. It should be appreciated that the memory access manager 510 is configured to manage access to one or more of the caches 206, 212, the main memory 216, the data storage device 218, and other memory (e.g., a memory local to the HFI 222) of the remote computing node 106. As such, the memory access manager 510 may be configured to reside in or otherwise interface with hardware, the operating system, and/or programs/applications of the remote computing node 106. In data flow 540, the memory access manager 510 returns the retrieved data to the remote HFI 506. In data flow 542, the remote HFI 506 forwards the retrieved data to the local HFI 504. In data flow 544, the local HFI 504 forwards the data returned by the memory access manager 510 to the local core 502 (e.g., to be used in a present processing task, propagation by the software stack to the requesting application, etc.).

Data flows 546 to 554 describe an illustrative write transaction on a remotely homed (i.e., relative to the local computing node 104) object that is presently associated with a transactional synchronization session. It should be appreciated that the transactional synchronization session should presently be in write mode to perform the write transaction on the object bound to the write transaction. In data flow 546, the application executing on the local core 502 initiates a write transaction associated with the object, such as by transmitting instructions from the local core 502 (e.g., via the software stack of the local computing node 104) to the local HFI 504.

In data flow 548, due to the object being remotely homed relative to the local computing node 104 and locally homed relative to the remote computing node 106, the local HFI 504 forwards the write transaction to the remote HFI 506. In data flow 550, the remote HFI 506 stores the data (e.g., a payload) associated with the write transaction to a temporary buffer (see, e.g., the buffer storage 224 of FIG. 2). In some embodiments, the remote HFI 506 additionally stores the storage location (e.g., a physical or virtual address) of the data to an entry of a table (e.g., the transaction storage table), such that the data can be associated with the object and retrieved at a later point in time. In data flow 552, the remote HFI 506 returns an acknowledgment of a successful write transaction to the local HFI 504. In data flow 554, the local HFI 504 forwards the acknowledgment of the successful write transaction to the local core 502.

Data flows 556 to 560, shown in FIG. 5C, describe an illustrative violation during a transactional synchronization session. For example, in data flow 556, the remote core 508 may initiate (e.g., via instruction(s) from the software stack of the remote computing node 106) an object association request with the remote HFI 506 that includes the transactional ID and an access mode that conflicts with the present access mode of a presently in-session transactional synchronization session for a particular object. The object association request may be initiated by the local core 502 of the local computing node 102, as shown in FIG. 5A, by another core of the remote computing node 106, or by a processor core of another computing device 102.

In an illustrative example, the object association request received by the remote HFI 506 from the remote core 508 may include a write mode access request for an object presently associated with a write mode enabled transaction of the local core 502. Accordingly, in furtherance of the illustrative example, in data flow 558, the remote HFI 506 may issue a software stack violation notification via a software interrupt that indicates the violation has occurred for a particular object.

Further, in data flow 560, the remote HFI 506 may delete all temporarily stored data associated with the presently in-session write transaction. It should be appreciated that other transactions received from the remote core 508 for an object presently associated with a write mode enabled transaction of the local core 502 may not cause a violation, such as a read transaction. It should be further appreciated that if the object presently associated with the transactional synchronization session initiated by the local core 502 is in read mode, or in promote mode and not yet promoted to write mode, a read or write transaction received from another processor core may not result in a violation.

Data flows 562 to 576 describe an illustrative transactional synchronization session termination. In data flow 562, an event occurs at the local core 502 (e.g., a task ends, a process exits, etc.) in which the transactional synchronization session is no longer needed. As such, in data flow 564, the local core 502 transmits, to the local HFI 504, a request to exit the transactional synchronization session (i.e., a transactional synchronization session exit request) via an instruction from the software stack that includes the corresponding transaction ID. In data flow 566, due to the object being remotely homed relative to the local computing node 104 and locally homed relative to the remote computing node 106, the local HFI 504 forwards the a transactional synchronization session exit request to the remote HFI 506.

In data flow 568, upon receiving the a transactional synchronization session exit request, the remote HFI 506 initiates a write of data temporarily stored by the remote HFI 506 during previous write transactions associated with the object and transaction ID, such as may have been stored in a temporary buffer of the remote HFI 506. In data flow 570, the memory access manager 510 writes the data associated with the object and transaction ID received from the remote HFI 506 to memory of the remote computing node 106 (e.g., the main memory 216). In data flow 572, the memory access manager 510 transmits, to the remote HFI 506, an acknowledgment of the successful write of the associated data to the memory. In data flow 574, the remote HFI 506 forward the acknowledgment of the successful write to the local HFI 504. Upon receipt of the acknowledgment of the successful write, in data flow 576, the local HFI 504 generates a software stack notification. In data flow 578, the HFI transmits an acknowledgment that includes the software stack notification to the local core 502.

As described previously, the local HFI 504 may be configured to track each of the read/write transactions (e.g., in a corresponding entry of a monitoring table) and the remote computing nodes 106 for which the object is remotely homed. Accordingly, upon receiving the transactional synchronization session exit request, the local HFI 504 may broadcast (e.g., via a unicast transmission) the transactional synchronization session exit request to each of the tracked remote computing nodes 106. As such, the local HFI 504 may be further configured to receive an acknowledgment from each of the applicable remote computing nodes 106 before notifying to the software stack that the transaction has been successfully completed.

Figure 6A:
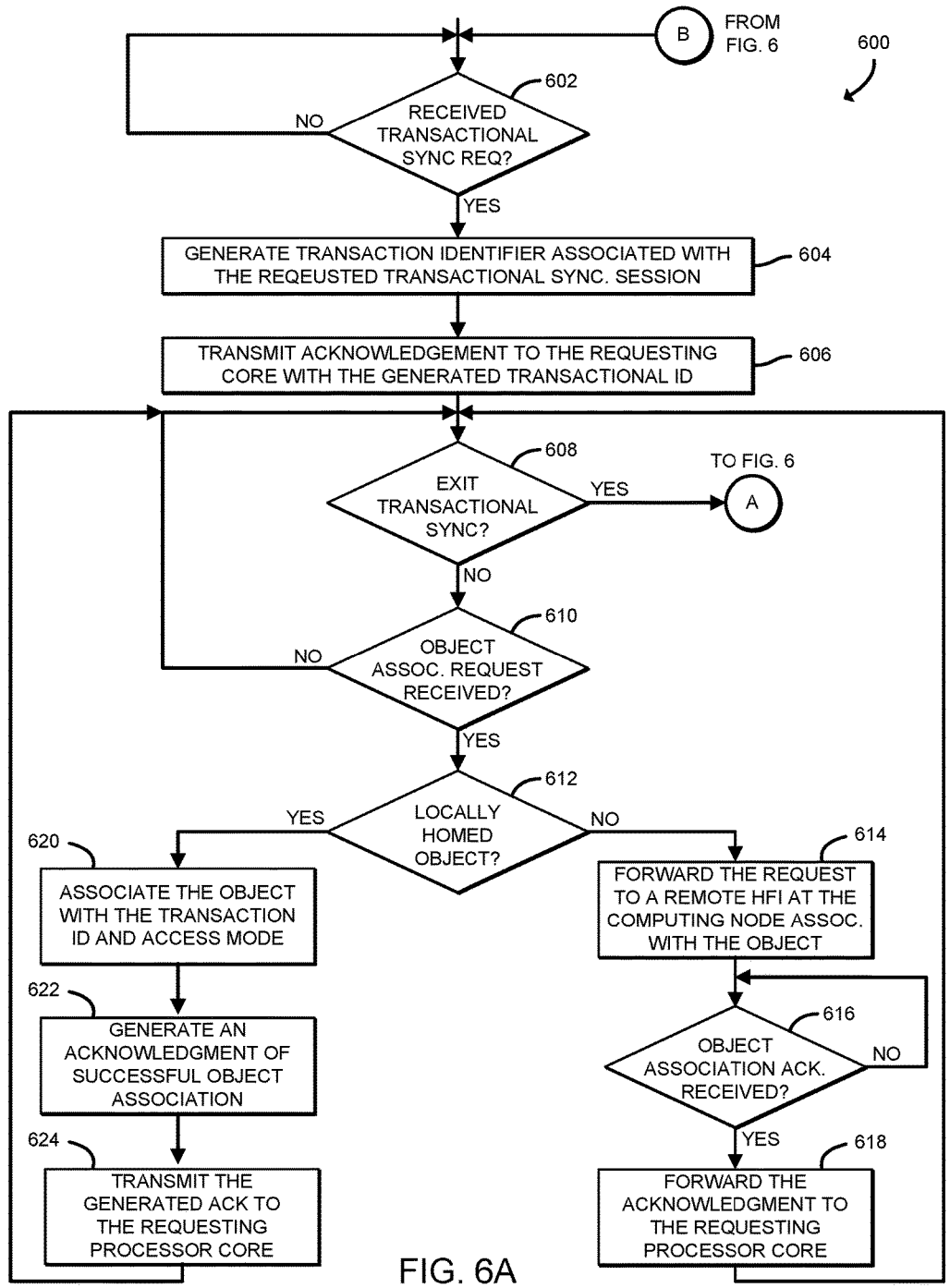
FIGS. 6A-6B is a simplified flow diagram of at least one embodiment for initializing a transactional synchronization session that may be executed by one or more of the computing nodes of the system of FIG. 1.
Figure 6B:
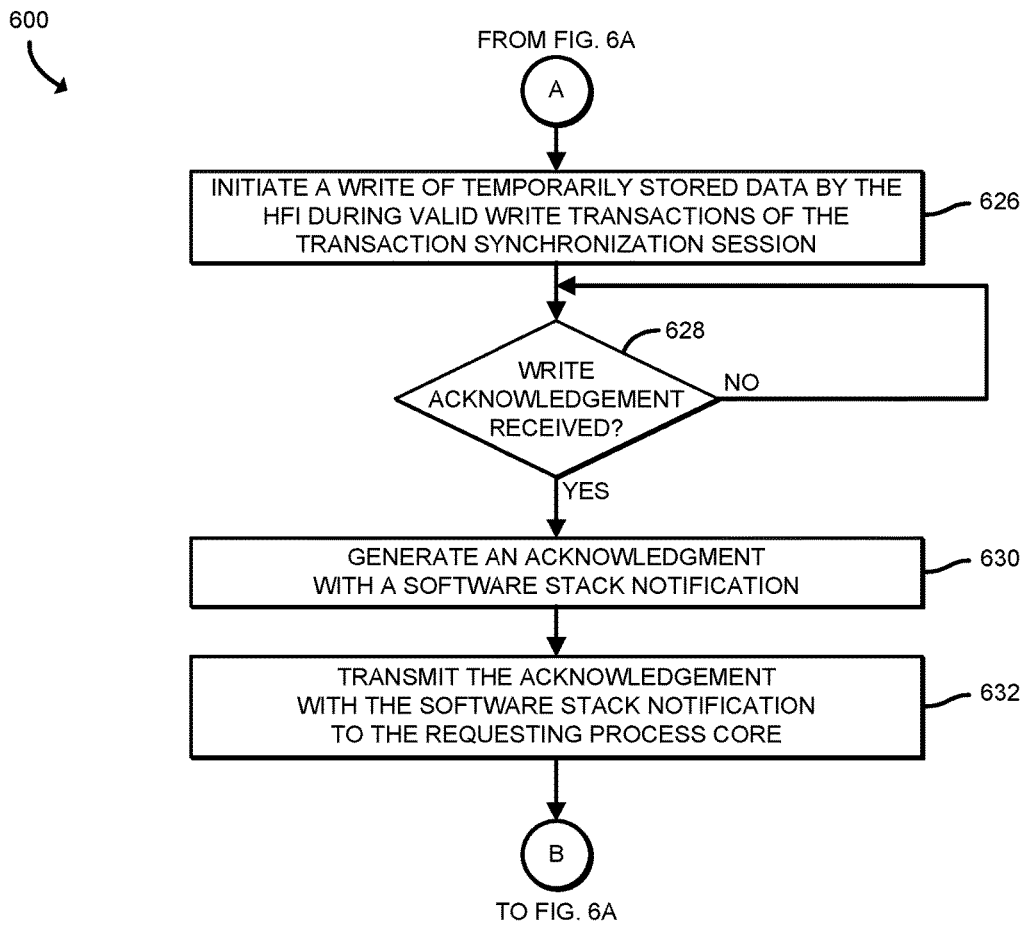

Referring now to FIGS. 6A and 6B, in use, a computing node 102 (e.g., the local computing node 104) may execute a method 600 for initializing a transactional synchronization session. The method 600 begins in block 602, in which the local computing node 104 determines whether a request to initialize a transactional synchronization session has been received (e.g., the via the software stack) from an application presently executing on a processor core of a processor of the computing node 102. As described previously, the request may be initialized by an application presently executing on a process core (e.g., one of the processor cores 204, 210 of one of the processors 202, 208 of FIG. 2) of the local computing node 104 via instruction(s) received by the HFI (e.g., the HFI 222 of FIG. 2) of the local computing node 104 from the software stack. As described previously, in some embodiments, the instruction(s) may include a pointer to a location in memory at which one or more parameters of the transactional synchronization session may be stored.

If a request to initialize a transactional synchronization session has been received by the HFI 222, the method 600 advances to block 604, in which the HFI 222 generates a transaction ID associated with the requested transactional synchronization session. In block 606, the HFI 222 transmits an acknowledgment to the requesting application (e.g., via the software stack) with the generated transactional ID. In block 608, the HFI 222 determines whether a request to exit the transactional synchronization session (i.e., a transactional synchronization session exit request) has been received. If not, the method 600 branches to block 610; otherwise, the method 600 branches to block 626, which is shown in FIG. 6B and described below. In block 610, the HFI 222 determines whether an object association request has been received. If not, the method 600 returns to block 608 to determine whether a transactional synchronization session exit request has been received; otherwise, the method 600 advances to block 612.

In block 612, the HFI 222 determines whether the object to be associated with the transactional synchronization session is locally homed. In other words, the HFI 222 determines whether the object to be associated with the transactional synchronization session is local relative to the local computing node 104 (i.e., locally homed) or remote relative to the local computing node 104 (i.e., remotely homed) such that the computing node responsible for managing coherency of the object is not the local computing node 104, but rather another computing node 102 (e.g., one of the remote computing nodes 106 of FIG. 1).

If the associated object is remotely homed (i.e., locally homed to another computing node 102), the method 600 branches to block 614, in which the HFI 222 forwards the request to a remote HFI of a remote computing node 106 to which the object is locally homed. In block 616, the HFI 222 determines whether an acknowledgement has been received from the remote HFI that indicates a successful object association has occurred. If so, the method 600 advances to block 618 in which the HFI 222 forwards the acknowledgement to the processor core for which the object association request corresponds before the method 600 returns to block 608 to determine whether a transactional synchronization session exit request has been received.

Referring again to block 612, if the HFI 222 determines the object to be associated with the transactional synchronization session is locally homed, the method 600 branches to block 620. In block 620, the HFI 222 associates the object with the transactional synchronization session using the transaction ID in the requested access mode. To do so, in some embodiments, the HFI 222 may be configured to register object information of the local object associated with the transactional synchronization session in an entry of a monitoring table.

As described previously, the object information stored in an entry of the monitoring table may include a memory address of the object, an access mode (e.g., read, write, etc.) associated with the object, a transaction ID associated with the transactional synchronization session, an identifier of the computing node 102 to which the object is locally homed, and/or any other information related to the object associated with the transaction. In block 622, the HFI 222 generates an acknowledgment of a successful object association. In block 624, the HFI 222 transmits the generated acknowledgment to the processor core for which the object association request corresponds before the method 600 returns to block 608 to determine whether a transactional synchronization session exit request has been received.

As previously described, in block 608, if the HFI 222 determines whether a transactional synchronization session exit request has been received, the method 600 branches to block 626. In block 626, the HFI 222 initializes a write of any data temporarily stored at the HFI during valid write transactions of the transaction synchronization session. To do so, in some embodiments, the HFI may provide an indication to a memory coherency manager of the local computing node 104 that includes object information usable to retrieve the temporarily stored data. In block 628, the HFI 222 determines whether the data has been successfully written to memory. In some embodiments, the HFI 222 may receive a write acknowledgment from the memory coherency manager indicating a successful write of the corresponding data to memory. If the HFI 222 determines the data has been successfully written to memory, the method 600 advances to block 630, shown in FIG. 6B. In block 630, the HFI 222 generates an acknowledgment that includes a software stack notification indicating the successful write. In block 632, the HFI 222 transmits the acknowledgment with the software stack notification to the requesting application presently executing on the processor core.

Figure 7:
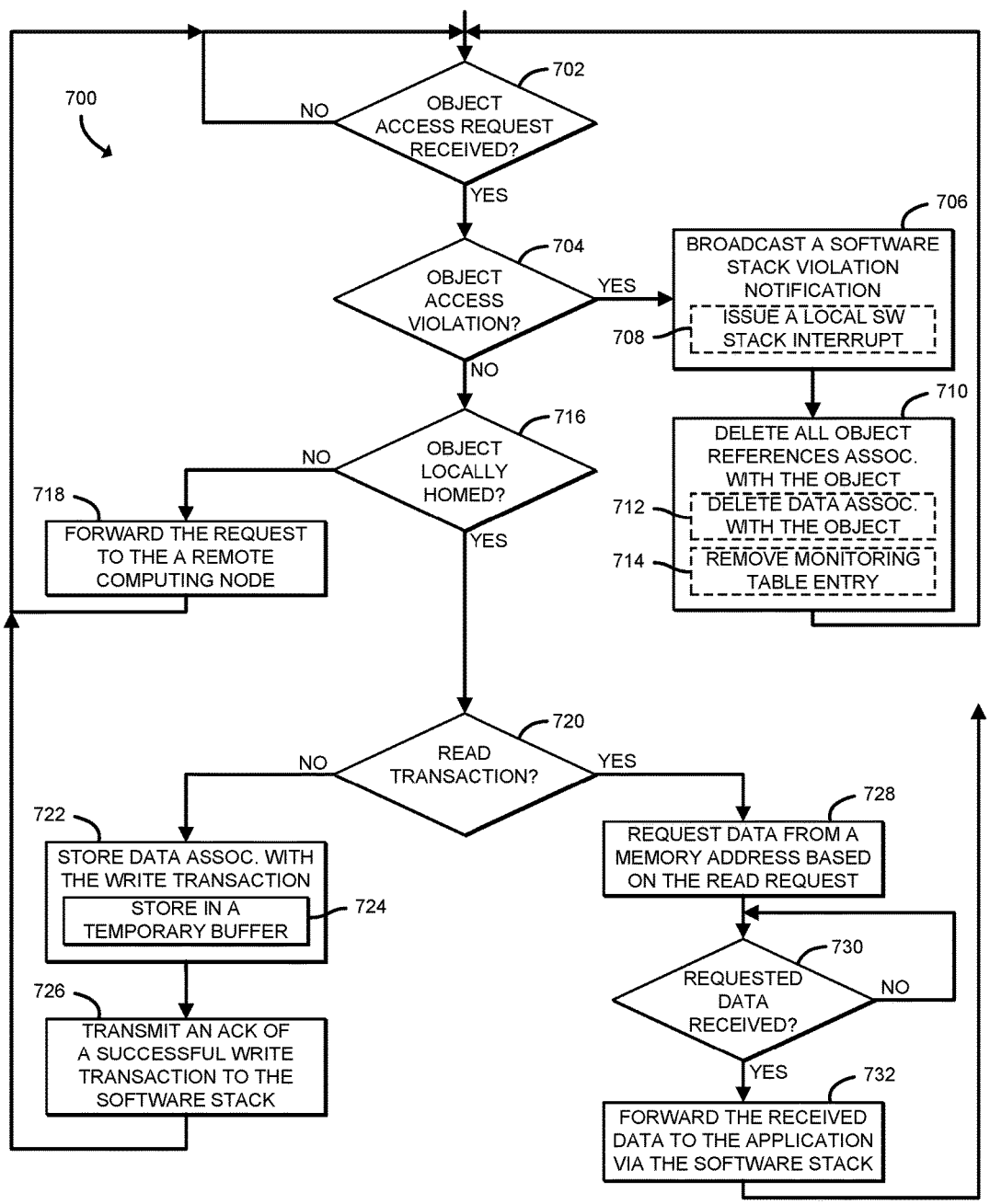
FIG. 7 is a simplified flow diagram of at least one embodiment for performing read/write transactions on an object for which a transactional synchronization session is presently active that may be executed by one or more of the computing nodes of the system of FIG. 1.

Referring now to FIG. 7, in use, a computing node 102 (e.g., the local computing node 104) may execute a method 700 for performing read/write transactions on an object for which a transactional synchronization session is presently active (see, e.g., the method 600 of FIGS. 6A and 6B). The method 700 begins in block 702, in which the HFI 222 of the local computing node 104 determines whether a request for object access has been received (e.g., the via the software stack) from an application presently executing on a processor core of a processor of the computing node 102. If so, the method 700 advances to block 704, in which the HFI 222 determines whether an object access violation has occurred. As described previously, an object access violation may be triggered by a read or write transaction initiated by a processor core for which access to a particular object has been associated with another processor core, either local to the computing node 102 or remote to the computing node 102, to which a particular level of access has been assigned and a transactional synchronization session is presently active.

If an object access violation has not occurred, the method 700 branches to block 716, which is described below; otherwise, if an object access violation has occurred, the method 700 branches to block 706. In block 706, the HFI 222 generates and broadcasts a software stack violation notification. To do so, in some embodiments, in block 708, the HFI 222 issues a local software stack interrupt. In block 710, the HFI 222 deletes all object references associated with the object. To do so, in some embodiments, in block 712, the HFI 222 may flush the presently stored data associated with the object from the temporary buffer (e.g., the buffer storage 224), as may have been saved during valid write transactions associated with the object. Additionally or alternatively, in some embodiments, in block 714, the HFI 222 may remove a monitoring table entry corresponding to the object and the transactional synchronization session.

As described above, if the HFI 222 determines that an object access violation has not occurred in block 704, the method 700 branches to block 716. In block 716, the HFI 222 determines whether the object is locally homed. As described previously, the HFI 222 determines whether the object associated with the transaction is local relative to the computing node 102 (i.e., locally homed) or remote relative to the computing node 102 (i.e., remotely homed). The object is considered to be remotely homed if the computing node responsible for managing coherency of the object is not the computing node 102, but rather another computing node (e.g., one of the remote computing nodes 106 of FIG. 1). Accordingly, if the object is not locally homed, the method 700 branches to block 718. In block 718, the HFI 222 forwards the object access request received in block 702 to a corresponding remote computing node 106 before the method 700 returns to block 702 to determine whether another object access request has been received. Otherwise, if the object is locally homed, the method 700 branches to block 720.

In block 720, the HFI 222 determines whether the object access request received in block 702 corresponds to a read transaction. If not (i.e., the object access request received in block 702 corresponds to a write transaction), the method 700 branches to block 722; otherwise the method 700 branches to block 728, which is described below. In block 722, the HFI 222 stores data (e.g., a payload) associated with the write transaction. To do so, in block 724, the HFI 222 stored the data in a temporary buffer (e.g., the buffer storage 224 of FIG. 2). In block 726, the HFI 222 transmits an acknowledgment of the successful storage of data associated with the write transaction to the software stack (i.e., for use in a present processing task at the requesting processor core, propagation by the software stack to the requesting application, etc.) before the method 700 returns to block 702 to determine whether another object access request has been received.

As described above, if the HFI 222 determines that the object access request received in block 702 corresponds to a read transaction in block 720, the method 700 branches to block 728. In block 728, the HFI 222 requests data from a memory address (e.g., via a memory coherency manager, a homed agent, etc.). based on the read request. In block 730, the HFI 222 determines whether the requested data has been received. If so, the method 700 advances to block 732, in which the HFI 222 forwards the received data to the requesting application (e.g., via the software stack) before the method 700 returns to block 702 to determine whether another object access request has been received.

It should be appreciated, as described above, that at least a portion of the methods 600 and 700 may be executed by the HFI 222 of the communication circuitry 220 of the computing node 102. It should be further appreciated that, in some embodiments, one or more of the methods 600 and 700 may be embodied as various instructions stored on a computer-readable media, which may be executed by one or more of the processors 202, 208 (e.g., via one or more of the respective processor cores 204, 210), the HFI 222 of the communication circuitry 220, and/or other components of the computing node 102 to cause the network switch 114 to perform the methods 600 and 700. The computer-readable media may be embodied as any type of media capable of being read by the computing node 102 including, but not limited to, the main memory 216, the data storage device 218, the buffer storage 224 of the HFI 222, and/or other memory or data storage devices of the computing node 102, portable media readable by a peripheral device of the computing node 102, and/or other media.

EXAMPLES

Illustrative examples of the technologies disclosed herein are provided below. An embodiment of the technologies may include any one or more, and any combination of, the examples described below.

Example 1 includes a computing node for performing switch-based collective operations in a fabric architecture in which the computing node is communicatively coupled to a plurality of interconnected computing nodes of the fabric architecture, the computing node comprising a processor that includes one or more processor cores; a host fabric interface (HFI); and one or more data storage devices having stored therein a plurality of instructions that, when executed by the processor, cause the computing node to generate, by the HFI and in response to having received a transactional synchronization session initialization request from an application presently executing on a processor core of the one or more processor cores, a transaction identifier for a transactional synchronization session; transmit, by the HFI, the generated transaction identifier to the processor core; associate, by the HFI and in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request; determine, by the HFI and in response to a determination that the object association request corresponds to a write transaction request, whether the object is locally homed relative to the computing node, wherein the write transaction request includes data to be stored at a memory address associated with the object; store, by the HFI and in response to a determination that the object is locally homed, the received data in a local buffer of the HFI; and initiate, by the HFI and in response to having received a transactional synchronization session exit request from the processor core, a write of the data stored in the local buffer of the HFI to one of the one or more data storage devices.

Example 2 includes the subject matter of Example 1, and wherein to receive a transactional synchronization session initialization request comprises to receive an instruction from the processor core via a software stack of the computing node, and wherein the instruction includes the session initialization request.

Example 3 includes the subject matter of any of Examples 1 and 2, and wherein to associate the transaction identifier with the object identifier and the access mode of the object association request comprises to (i) determine whether the object associated with the object identifier is locally homed relative to the computing node and (ii) store the transaction identifier, the object identifier, and the access mode in an entry of a monitoring table, wherein the monitoring table is usable to monitor transactions associated with the object during the transactional synchronization session.

Example 4 includes the subject matter of any of Examples 1-3, and wherein the entry of the monitoring table further includes an identifier of the computing node for which the object is locally homed.

Example 5 includes the subject matter of any of Examples 1-4, and wherein the object identifier comprises an address of the object in data storage device of the computing node.

Example 6 includes the subject matter of any of Examples 1-5, and wherein to store the received data in the local buffer of the HFI further comprises to store a local buffer address in a transaction storage table, wherein the local buffer address corresponds to a location of the stored data in the local buffer of the HFI.

Example 7 includes the subject matter of any of Examples 1-6, and wherein the plurality of instructions further cause the computing node to forward, by the HFI and in response to a determination that the object is not locally homed, the write transaction request to a remote computing node for which the object is locally homed.

Example 8 includes the subject matter of any of Examples 1-7, and wherein the plurality of instructions further cause the computing node to transmit, by the HFI and in response to having received a read transaction associated with the object from the processor core, a data retrieval request to a memory access manager of the computing node, wherein the data retrieval request is usable to retrieve data associated with the read transaction; receive, by the HFI, the requested data from the memory access manager; and forward, by the HFI, the received requested data to the processor core.

Example 9 includes the subject matter of any of Examples 1-8, and wherein the plurality of instructions further cause the computing node to generate, by the HFI and subsequent to having received an acknowledgment of a successful write of the data stored in the local buffer of the HFI, an acknowledgment with a software stack notification; and transmit, by the HFI, an acknowledgement with the software stack notification to the requesting application.

Example 10 includes the subject matter of any of Examples 1-9, and wherein the plurality of instructions further cause the computing node to detect, by the HFI, an object access violation; broadcast, by the HFI, a software stack violation notification; and delete, by the HFI, all object references associated with the object.

Example 11 includes the subject matter of any of Examples 1-10, and wherein to broadcast the software stack violation notification comprises to issue a local software stack interrupt.

Example 12 includes the subject matter of any of Examples 1-11, and wherein to delete all object references associated with the object comprises to delete data associated with corresponding write transactions stored in a storage buffer of the HFI.

Example 13 includes the subject matter of any of Examples 1-12, and wherein to delete all object references associated with the object comprises to remove object information corresponding to the object from a corresponding entry of a monitoring table usable to monitor transactions associated with the object during the transactional synchronization session.

Example 14 includes a computing node for performing switch-based collective operations in a fabric architecture in which the computing node is communicatively coupled to a plurality of interconnected computing nodes of the fabric architecture, the computing node comprising a transactional synchronization management circuit to generate, in response to having received a transactional synchronization session initialization request from an application presently executing on a processor core of one or more processor cores of a processor of the computing node, a transaction identifier for a transactional synchronization session; transmit the generated transaction identifier to the processor core; associate, in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request; determine, in response to a determination that the object association request corresponds to a write transaction request, whether the object is locally homed relative to the computing node, wherein the write transaction request includes data to be stored at a memory address associated with the object; store, in response to a determination that the object is locally homed, the received data in a local buffer of the HFI; and initiate, in response to having received a transactional synchronization session exit request from the processor core, a write of the data stored in the local buffer of the HFI to one of the one or more data storage devices.

Example 15 includes the subject matter of Example 14, and wherein to receive a transactional synchronization session initialization request comprises to receive an instruction from the processor core via a software stack of the computing node, and wherein the instruction includes the session initialization request.

Example 16 includes the subject matter of any of Examples 14 and 15, and wherein to associate the transaction identifier with the object identifier and the access mode of the object association request comprises to (i) determine whether the object associated with the object identifier is locally homed relative to the computing node and (ii) store the transaction identifier, the object identifier, and the access mode in an entry of a monitoring table, wherein the monitoring table is usable to monitor transactions associated with the object during the transactional synchronization session.

Example 17 includes the subject matter of any of Examples 14-16, and wherein the entry of the monitoring table further includes an identifier of the computing node for which the object is locally homed.

Example 18 includes the subject matter of any of Examples 14-17, and wherein the object identifier comprises an address of the object in data storage device of the computing node.

Example 19 includes the subject matter of any of Examples 14-18, and wherein to store the received data in the local buffer of the HFI further comprises to store a local buffer address in a transaction storage table, wherein the local buffer address corresponds to a location of the stored data in the local buffer of the HFI.

Example 20 includes the subject matter of any of Examples 14-19, and further including a communication management module to forward, in response to a determination that the object is not locally homed, the write transaction request to a remote computing node for which the object is locally homed.

Example 21 includes the subject matter of any of Examples 14-20, and wherein the transactional synchronization management circuit is further to transmit, in response to having received a read transaction associated with the object from the processor core, a data retrieval request to a memory access manager of the computing node, wherein the data retrieval request is usable to retrieve data associated with the read transaction; receive the requested data from the memory access manager; and forward the received requested data to the processor core.

Example 22 includes the subject matter of any of Examples 14-21, and wherein the transactional synchronization management circuit is further to generate, subsequent to having received an acknowledgment of a successful write of the data stored in the local buffer of the HFI, an acknowledgment with a software stack notification; and transmit an acknowledgement with the software stack notification to the requesting application.

Example 23 includes the subject matter of any of Examples 14-22, and wherein the transactional synchronization management circuit is further to detect an object access violation; broadcast a software stack violation notification; and delete all object references associated with the object.

Example 24 includes the subject matter of any of Examples 14-23, and wherein to broadcast the software stack violation notification comprises to issue a local software stack interrupt.

Example 25 includes the subject matter of any of Examples 14-24, and wherein to delete all object references associated with the object comprises to delete data associated with corresponding write transactions stored in a storage buffer of the HFI.

Example 26 includes the subject matter of any of Examples 14-25, and wherein to delete all object references associated with the object comprises to remove object information corresponding to the object from a corresponding entry of a monitoring table usable to monitor transactions associated with the object during the transactional synchronization session.

Example 27 includes a method for performing switch-based collective operations in a fabric architecture, the method comprising generating, by a host fabric interface (HFI) of a computing node and in response to having received a transactional synchronization session initialization request from an application presently executing on a processor core of a processor of the computing node, a transaction identifier for a transactional synchronization session; transmitting, by the HFI, the generated transaction identifier to the processor core; associating, by the HFI and in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request; determining, by the HFI and in response to a determination that the object association request corresponds to a write transaction request, whether the object is locally homed relative to the computing node, wherein the write transaction request includes data to be stored at a memory address associated with the object; storing, by the HFI and in response to a determination that the object is locally homed, the received data in a local buffer of the HFI; and initiating, by the HFI and in response to having received a transactional synchronization session exit request from the processor core, a write of the data stored in the local buffer of the HFI to one of the one or more data storage devices.

Example 28 includes the subject matter of Example 27, and wherein receiving a transactional synchronization session initialization request comprises receiving an instruction from the processor core via a software stack of the computing node, and wherein the instruction includes the session initialization request.

Example 29 includes the subject matter of any of Examples 27 and 28, and wherein associating the transaction identifier with the object identifier and the access mode of the object association request comprises (i) determining whether the object associated with the object identifier is locally homed relative to the computing node and (ii) storing the transaction identifier, the object identifier, and the access mode in an entry of a monitoring table, wherein the monitoring table is usable to monitor transactions associated with the object during the transactional synchronization session.

Example 30 includes the subject matter of any of Examples 27-29, and further including storing an identifier of the computing node for which the object is locally homed in the entry of the monitoring table.

Example 31 includes the subject matter of any of Examples 27-30, and wherein associating the transaction identifier with the object identifier comprises associating the transaction identifier with an address of the object in a data storage device of the computing node.

Example 32 includes the subject matter of any of Examples 27-31, and wherein storing the received data in the local buffer of the HFI further comprises storing a local buffer address in a transaction storage table, wherein the local buffer address corresponds to a location of the stored data in the local buffer of the HFI.

Example 33 includes the subject matter of any of Examples 27-32, and further including forwarding, by the HFI and in response to a determination that the object is not locally homed, the write transaction request to a remote computing node for which the object is locally homed.

Example 34 includes the subject matter of any of Examples 27-33, and further including transmitting, by the HFI and in response to having received a read transaction associated with the object from the processor core, a data retrieval request to a memory access manager of the computing node, wherein the data retrieval request is usable to retrieve data associated with the read transaction; receiving, by the HFI, the requested data from the memory access manager; and forwarding, by the HFI, the received requested data to the processor core.

Example 35 includes the subject matter of any of Examples 27-34, and further including generating, by the HFI and subsequent to having received an acknowledgment of a successful write of the data stored in the local buffer of the HFI, an acknowledgment with a software stack notification; and transmitting, by the HFI, an acknowledgement with the software stack notification to the requesting application.

Example 36 includes the subject matter of any of Examples 27-35, and further including detecting, by the HFI, an object access violation; broadcasting, by the HFI, a software stack violation notification; and deleting, by the HFI, all object references associated with the object.

Example 37 includes the subject matter of any of Examples 27-36, and wherein broadcasting the software stack violation notification comprises issuing a local software stack interrupt.

Example 38 includes the subject matter of any of Examples 27-37, and wherein deleting all object references associated with the object comprises deleting data associated with corresponding write transactions stored in a storage buffer of the HFI.

Example 39 includes the subject matter of any of Examples 27-38, and wherein deleting all object references associated with the object comprises removing object information corresponding to the object from a corresponding entry of a monitoring table usable to monitor transactions associated with the object during the transactional synchronization session.

Example 40 includes a computing node comprising a processor; and a memory having stored therein a plurality of instructions that when executed by the processor cause the computing node to perform the method of any of Examples 27-39.

Example 41 includes one or more machine readable storage media comprising a plurality of instructions stored thereon that in response to being executed result in a computing node performing the method of any of Examples 27-39.

Example 42 includes a computing node for performing switch-based collective operations in a fabric architecture in which the computing node is communicatively coupled to a plurality of interconnected computing nodes of the fabric architecture, the computing node comprising means for generating, in response to having received a transactional synchronization session initialization request from an application presently executing on a processor core of a processor of the computing node, a transaction identifier for a transactional synchronization session; means for transmitting the generated transaction identifier to the processor core; means for associating, in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request; means for determining, in response to a determination that the object association request corresponds to a write transaction request, whether the object is locally homed relative to the computing node, wherein the write transaction request includes data to be stored at a memory address associated with the object; means for storing, in response to a determination that the object is locally homed, the received data in a local buffer of the HFI; and means for initiating, in response to having received a transactional synchronization session exit request from the processor core, a write of the data stored in the local buffer of the HFI to one of the one or more data storage devices.

Example 43 includes the subject matter of Example 42, and wherein the means for receiving a transactional synchronization session initialization request comprises means for receiving an instruction from the processor core via a software stack of the computing node, and wherein the instruction includes the session initialization request.

Example 44 includes the subject matter of any of Examples 42 and 43, and wherein the means for associating the transaction identifier with the object identifier and the access mode of the object association request comprises means for (i) determining whether the object associated with the object identifier is locally homed relative to the computing node and (ii) storing the transaction identifier, the object identifier, and the access mode in an entry of a monitoring table, wherein the monitoring table is usable to monitor transactions associated with the object during the transactional synchronization session.

Example 45 includes the subject matter of any of Examples 42-44, and further including means for storing an identifier of the computing node for which the object is locally homed in the entry of the monitoring table.

Example 46 includes the subject matter of any of Examples 42-45, and wherein the means for associating the transaction identifier with the object identifier comprises means for associating the transaction identifier with an address of the object in a data storage device of the computing node.

Example 47 includes the subject matter of any of Examples 42-46, and wherein the means for storing the received data in the local buffer of the HFI further comprises means for storing a local buffer address in a transaction storage table, wherein the local buffer address corresponds to a location of the stored data in the local buffer of the HFI.

Example 48 includes the subject matter of any of Examples 42-47, and further including means for forwarding, in response to a determination that the object is not locally homed, the write transaction request to a remote computing node for which the object is locally homed.

Example 49 includes the subject matter of any of Examples 42-48, and further including means for transmitting, in response to having received a read transaction associated with the object from the processor core, a data retrieval request to a memory access manager of the computing node, wherein the data retrieval request is usable to retrieve data associated with the read transaction; means for receiving the requested data from the memory access manager; and means for forwarding the received requested data to the processor core.

Example 50 includes the subject matter of any of Examples 42-49, and further including means for generating, subsequent to having received an acknowledgment of a successful write of the data stored in the local buffer of the HFI, an acknowledgment with a software stack notification; and means for transmitting an acknowledgement with the software stack notification to the requesting application.

Example 51 includes the subject matter of any of Examples 42-50, and further including means for detecting an object access violation; means for broadcasting a software stack violation notification; and means for deleting all object references associated with the object.

Example 52 includes the subject matter of any of Examples 42-51, and wherein the means for broadcasting the software stack violation notification comprises means for issuing a local software stack interrupt.

Example 53 includes the subject matter of any of Examples 42-52, and wherein the means for deleting all object references associated with the object comprises means for deleting data associated with corresponding write transactions stored in a storage buffer of the HFI.

Example 54 includes the subject matter of any of Examples 42-53, and wherein the means for deleting all object references associated with the object comprises means for removing object information corresponding to the object from a corresponding entry of a monitoring table usable to monitor transactions associated with the object during the transactional synchronization session.

The invention claimed is:

1. A computing node for performing switch-based collective operations in a fabric architecture in which the computing node is communicatively coupled to a plurality of interconnected computing nodes of the fabric architecture, the computing node comprising:
   a processor that includes one or more processor cores;
   a host fabric interface (HFI); and
   one or more data storage devices having stored therein a plurality of instructions that, when executed by the processor, cause the computing node to:
      generate, by the HFI and in response to having received a transactional synchronization session initialization request from an application presently executing on a processor core of the one or more processor cores, a transaction identifier for a transactional synchronization session;
      transmit, by the HFI, the generated transaction identifier to the processor core;
      associate, by the HFI and in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request;
      determine, by the HFI and in response to a determination that the object association request corresponds to a write transaction request, whether the object is locally homed relative to the computing node, wherein the write transaction request includes data to be stored at a memory address associated with the object;
      store, by the HFI and in response to a determination that the object is locally homed, the received data in a local buffer of the HFI; and
      initiate, by the HFI and in response to having received a transactional synchronization session exit request from the processor core, a write of the data stored in the local buffer of the HFI to one of the one or more data storage devices.

2. The computing node of claim 1, wherein to receive a transactional synchronization session initialization request comprises to receive an instruction from the processor core via a software stack of the computing node, and wherein the instruction includes the session initialization request.

3. The computing node of claim 1, wherein to associate the transaction identifier with the object identifier and the access mode of the object association request comprises to (i) determine whether the object associated with the object identifier is locally homed relative to the computing node and (ii) store the transaction identifier, the object identifier, and the access mode in an entry of a monitoring table, wherein the monitoring table is usable to monitor transactions associated with the object during the transactional synchronization session.

4. The computing node of claim 1, wherein the object identifier comprises an address of the object in data storage device of the computing node.

5. The computing node of claim 1, wherein to store the received data in the local buffer of the HFI further comprises to store a local buffer address in a transaction storage table, wherein the local buffer address corresponds to a location of the stored data in the local buffer of the HFI.

6. The computing node of claim 1, wherein the plurality of instructions further cause the computing node to:
   transmit, by the HFI and in response to having received a read transaction associated with the object from the processor core, a data retrieval request to a memory access manager of the computing node, wherein the data retrieval request is usable to retrieve data associated with the read transaction;
   receive, by the HFI, the requested data from the memory access manager; and
   forward, by the HFI, the received requested data to the processor core.

7. The computing node of claim 1, wherein the plurality of instructions further cause the computing node to:
   detect, by the HFI, an object access violation;
   broadcast, by the HFI, a software stack violation notification; and
   delete, by the HFI, all object references associated with the object.

8. The computing node of claim 7, wherein to broadcast the software stack violation notification comprises to issue a local software stack interrupt.

9. The computing node of claim 7, wherein to delete all object references associated with the object comprises to delete one or more of (i) data associated with corresponding write transactions stored in a storage buffer of the HFI and (ii) object information corresponding to the object from a corresponding entry of a monitoring table usable to monitor transactions associated with the object during the transactional synchronization session.

10. One or more non-transitory, computer-readable storage media comprising a plurality of instructions stored thereon that in response to being executed cause a computing node to:
   generate, by a host fabric interface (HFI) of the computing node and in response to having received a transactional synchronization session initialization request from an application presently executing on a processor core of a processor of the computing node, a transaction identifier for a transactional synchronization session;
   transmit, by the HFI, the generated transaction identifier to the processor core;
   associate, by the HFI and in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request;
   determine, by the HFI and in response to a determination that the object association request corresponds to a write transaction request, whether the object is locally homed relative to the computing node, wherein the write transaction request includes data to be stored at a memory address associated with the object;
   store, by the HFI and in response to a determination that the object is locally homed, the received data in a local buffer of the HFI; and
   initiate, by the HFI and in response to having received a transactional synchronization session exit request from the processor core, a write of the data stored in the local buffer of the HFI to one of the one or more data storage devices.

11. The one or more non-transitory, computer-readable storage media of claim 10, wherein to receive a transactional synchronization session initialization request comprises to receive an instruction from the processor core via a software stack of the computing node, and wherein the instruction includes the session initialization request.

12. The one or more non-transitory, computer-readable storage media of claim 10, wherein to associate the transaction identifier with the object identifier and the access mode of the object association request comprises to (i) determine whether the object associated with the object identifier is locally homed relative to the computing node and (ii) store the transaction identifier, the object identifier, and the access mode in an entry of a monitoring table, wherein the monitoring table is usable to monitor transactions associated with the object during the transactional synchronization session.

13. The one or more non-transitory, computer-readable storage media of claim 10, wherein the object identifier comprises an address of the object in data storage device of the computing node.

14. The one or more non-transitory, computer-readable storage media of claim 10, wherein to store the received data in the local buffer of the HFI further comprises to store a local buffer address in a transaction storage table, wherein the local buffer address corresponds to a location of the stored data in the local buffer of the HFI.

15. The one or more non-transitory, computer-readable storage media of claim 10, wherein the plurality of instructions further cause the computing node to:
   transmit, by the HFI and in response to having received a read transaction associated with the object from the processor core, a data retrieval request to a memory access manager of the computing node, wherein the data retrieval request is usable to retrieve data associated with the read transaction;
   receive, by the HFI, the requested data from the memory access manager; and
   forward, by the HFI, the received requested data to the processor core.

16. The one or more non-transitory, computer-readable storage media of claim 10, wherein the plurality of instructions further cause the computing node to:
   detect, by the HFI, an object access violation;
   broadcast, by the HFI, a software stack violation notification; and
   delete, by the HFI, all object references associated with the object.

17. The one or more non-transitory, computer-readable storage media of claim 16, wherein to broadcast the software stack violation notification comprises to issue a local software stack interrupt.

18. The one or more non-transitory, computer-readable storage media of claim 16, wherein to delete all object references associated with the object comprises to delete at least one of (i) data associated with corresponding write transactions stored in a storage buffer of the HFI and (ii) object information corresponding to the object from a corresponding entry of a monitoring table usable to monitor transactions associated with the object during the transactional synchronization session.

19. A computing node for performing switch-based collective operations in a fabric architecture in which the computing node is communicatively coupled to a plurality of interconnected computing nodes of the fabric architecture, the computing node comprising:

means for generating, in response to having received a transactional synchronization session initialization request from an application presently executing on a processor core of a processor of the computing node, a transaction identifier for a transactional synchronization session;

means for transmitting the generated transaction identifier to the processor core;

means for associating, in response to having received an object association request that includes an identifier of an object and an access mode from the processor, the transaction identifier with the object identifier and the access mode of the object association request, wherein the access mode of the object association request is usable to determine whether the object association request comprises one of a write transaction request or a read transaction request;

means for determining, in response to a determination that the object association request corresponds to a write transaction request, whether the object is locally homed relative to the computing node, wherein the write transaction request includes data to be stored at a memory address associated with the object;

means for storing, in response to a determination that the object is locally homed, the received data in a local buffer of the HFI; and means for initiating, in response to having received a transactional synchronization session exit request from the processor core, a write of the data stored in the local buffer of the HFI to one of the one or more data storage devices.

20. The computing node of claim 19, wherein the means for receiving a transactional synchronization session initialization request comprises means for receiving an instruction from the processor core via a software stack of the computing node, and wherein the instruction includes the session initialization request.

21. The computing node of claim 19, wherein the means for associating the transaction identifier with the object identifier and the access mode of the object association request comprises means for (i) determining whether the object associated with the object identifier is locally homed relative to the computing node and (ii) storing the transaction identifier, the object identifier, and the access mode in an entry of a monitoring table, wherein the monitoring table is usable to monitor transactions associated with the object during the transactional synchronization session.

22. The computing node of claim 19, wherein the means for storing the received data in the local buffer of the HFI further comprises means for storing a local buffer address in a transaction storage table, wherein the local buffer address corresponds to a location of the stored data in the local buffer of the HFI.

23. The computing node of claim 19, further comprising:
means for transmitting, in response to having received a read transaction associated with the object from the processor core, a data retrieval request to a memory access manager of the computing node, wherein the data retrieval request is usable to retrieve data associated with the read transaction;
means for receiving the requested data from the memory access manager; and
means for forwarding the received requested data to the processor core.

24. The computing node of claim 19, further comprising:
means for detecting an object access violation;
means for broadcasting a software stack violation notification; and
means for deleting all object references associated with the object.

25. The computing node of claim 24, wherein the means for deleting all object references associated with the object comprises means for deleting at least one of (i) data associated with corresponding write transactions stored in a storage buffer of the HFI and (ii) object information corresponding to the object from a corresponding entry of a monitoring table usable to monitor transactions associated with the object during the transactional synchronization session.

* * * * *